United States Patent [19]
Tagawa et al.

[11] Patent Number: 5,457,632
[45] Date of Patent: Oct. 10, 1995

[54] VEHICLE STEERING CONTROL SYSTEM WHEREIN STEERING ANGLE CHANGE IS LIMITED TO WITHIN A PREDETERMINED RANGE UPON OCCURRENCE OF ABNORMALITY IN DETECTED VEHICLE YAW RATE

[75] Inventors: Shinichi Tagawa, Anjo; Hiroshi Nakashima, Nishio; Yasuo Uehara, Gotenba; Hideo Inoue, Yamakita, all of Japan

[73] Assignee: Toyota Jidosha Kabushiki Kaisha, Toyota, Japan

[21] Appl. No.: 184,133

[22] Filed: Jan. 19, 1994

[30] Foreign Application Priority Data

Jan. 19, 1993 [JP] Japan .................................. 5-007056

[51] Int. Cl.$^6$ ...................................................... B62D 5/04
[52] U.S. Cl. ...................... 364/424.05; 180/141; 180/791
[58] Field of Search .......................... 364/424.01, 424.02, 364/424.03, 424.04, 424.05; 180/79.1, 140, 141, 142; 280/91

[56] References Cited

U.S. PATENT DOCUMENTS

| | | | |
|---|---|---|---|
| 4,836,319 | 6/1989 | Haseda et al. | 180/142 |
| 5,150,764 | 9/1992 | Eguchi et al. | 180/141 |
| 5,180,026 | 1/1993 | Mori | 180/140 |
| 5,251,135 | 10/1993 | Serizawa et al. | 364/424.05 |
| 5,267,160 | 11/1993 | Ito et al. | 364/424.05 |
| 5,274,576 | 12/1993 | Williams | 364/565 |
| 5,285,390 | 2/1994 | Haseda et al. | 364/424.05 |
| 5,311,956 | 5/1994 | Sugiyama | 180/148 |
| 5,313,389 | 5/1994 | Yasui | 364/424.05 |
| 5,333,058 | 7/1994 | Shiraishi et al. | 364/424.05 |
| 5,345,385 | 9/1994 | Zomotor et al. | 364/424.05 |

FOREIGN PATENT DOCUMENTS

| | | |
|---|---|---|
| 59-100062 | 6/1984 | Japan . |
| 60-124572 | 7/1985 | Japan . |
| 60-161256 | 8/1985 | Japan . |
| 63-192667 | 8/1988 | Japan . |

*Primary Examiner*—Kevin J. Teska
*Assistant Examiner*—Susan Wieland
*Attorney, Agent, or Firm*—Cushman Darby & Cushman

[57] ABSTRACT

A system for controlling a steering angle of a vehicle, such as a steering angle of a rear steering wheel, the system having a yaw rate sensor for detecting a yaw rate of the vehicle, an actuator electrically controlled to change the steering angle of the vehicle, and a controller for controlling the actuator to control the steering angle on the basis of an input which includes at least a component derived from the detected yaw rate. The controller includes a detector for detecting an abnormality of a value of the yaw rate detected by the yaw rate sensor, and a limiter for limiting an amount of change in the steering angle to within a predetermined tolerable range when the abnormality is detected.

16 Claims, 15 Drawing Sheets

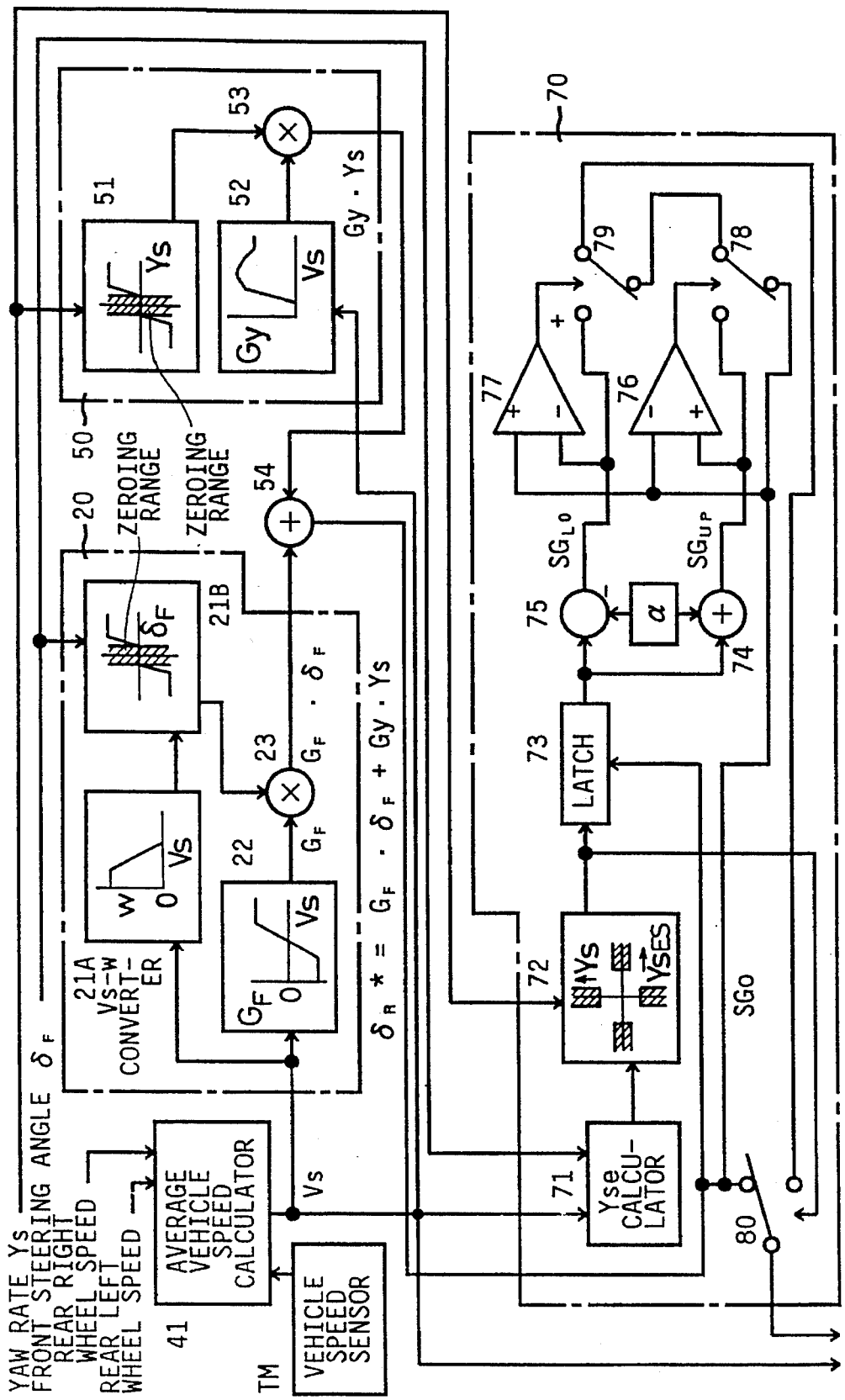

VEHICLE STEERING CONTROL SYSTEM WHEREIN STEERING ANGLE CHANGE IS LIMITED TO WITHIN A PREDETERMINED RANGE UPON OCCURRENCE OF ABNORMALITY IN DETECTED VEHICLE YAW RATE

BACKGROUND OF THE INVENTION

1. Field of the Invention

The present invention relates in general to a system for controlling a steering angle of a vehicle such as a motor vehicle, and more specifically to a system for controlling the steering angle of secondary steering wheels of a motor vehicle having four steering wheels, in relation to the steering angle of primary steering wheels of the vehicle.

2. Discussion of the Related Art

In a 4-wheel-steerable (4-WS) motor vehicle having two front steering wheels and two rear steering wheels, it is generally recognized that the front steering wheels serve as primary steering wheels while the rear steering wheels serve as secondary or auxiliary steering wheels. In a steering control system for such 4-wheel-steerable vehicle, a mechanical actuator controllable by the vehicle driver through a steering shaft is used to control the steering angle (hereinafter referred to as "primary steering angle") of the primary steering wheels, while an actuator in the form of an electrically operated motor is used to control the steering angle (hereinafter referred to as "secondary steering angle") of the secondary steering wheels such that the actual secondary steering angle as detected by a sensor coincides with a desired or target value which is determined on the basis of or in relation to the primary steering angle. In other words, the motor is electrically controlled so as to zero a difference between the determined target value and detected value of the secondary steering angle.

It is known that the speed of turning (generally referred to as "yaw velocity or yaw rate) of the vehicle about a vertical line which passes the gravity center of a motor vehicle increases with a rate of change in the steering angle. Consequently, a relatively rapid change in the rate of change in the primary steering angle will cause deterioration of the steerability of the vehicle and transverse slipping of the vehicle in a direction normal to the direction of running of the vehicle. JP-A-59-100062 discloses a steering control system adapted to control the secondary steering angle in relation to the yaw rate (yaw velocity) of the vehicle detected by a yaw rate sensor. However, this publication is silent on the details of a specific manner in which the secondary steering angle is controlled. JP-A-60-161256 teaches the use of a yaw rate gain Ys/θ, namely, a ratio of the yaw rate to the steering angle θ, which changes with a steering frequency (Hz) such that the yaw rate gain Ys/θ is the highest at 1 Hz and continuously decreases as the steering frequency increases or decreases from 1 Hz. The latter publication further teaches the desirability of maintaining the yaw rate gain (Ys/θ) constant in order to assure high steerability or stable steering of the vehicle, and at the same time either increasing a control gain K1 which determines an amount of change in the secondary steering angle with respect to the detected yaw rate, as the vehicle speed increases, or changing the control gain K1 according to a command generated by manipulation of a switch by the operator of the vehicle.

JP-A-60-124572 shows a secondary steering angle control system in which a target yaw rate is determined or calculated from detected primary steering angle S and vehicle speed F, and the actuator for changing the secondary steering angle is controlled so that the actual yaw rate detected by a yaw rate sensor coincides with the determined target yaw rate. However, JP-A-60-124572 does not teach details on the method by which the target yaw rate which suits the running condition of the vehicle is determined from the detected primary steering angle S and vehicle speed F. JP-A-63-192667 points out that the feedback control of the secondary steering angle on the basis of the yaw rate as proposed in the above-identified publication JP-A-60-124572 suffers from a time delay in the detection of the yaw rate with respect to the moment of a change in the actual yaw rate, and cannot be an effective measure for improving the steerability of the vehicle. In the light of this drawback, JP-A-63-192667 proposes an improved feedback control adapted to deal with the detection delay of the yaw rate.

In the secondary steering angle control system of the type in which the secondary steering angle is controlled according to the determined target yaw rate value, the secondary steering angle cannot be suitably controlled upon occurrence of any abnormality in the detected yaw rate, namely, in the presence of a relatively large error or noise in the output of the yaw rate sensor. For fail-safe control of the secondary steering angle, it may be a considered arrangement to determine whether the output signal of the yaw rate sensor has an intolerable error or not, and zero the secondary steering angle if the output signal is found to have an error larger than a threshold. This arrangement, however, suffers from an abrupt change (rapid zeroing) in the secondary steering angle in the event of detection of such excessive error in the output of the yaw rate sensor, whereby the running direction of the vehicle is likely to be changed unexpectedly to the vehicle driver. In other words, the forced zeroing of the secondary steering angle upon detection of abnormality in the detected yaw rate sensor will cause reduction in the steerability of the vehicle, with the secondary steering wheels kept at their neutral position in spite of a change in the primary steering angle.

The above drawback may be encountered in the control of the steering angle of the vehicle in general, irrespective of whether the steering angle is that of the front steering wheels or that of the rear steering wheels, provided that the detected yaw rate of the vehicle is utilized to control an electrically controlled actuator for controlling the front or rear steering angle of the vehicle.

SUMMARY OF THE INVENTION

It is therefore an object of the present invention to provide a steering control system for a vehicle, which is free from an abrupt change in the steering angle of the vehicle even in the event of occurrence of an abnormality in the detected value of the yaw rate of the vehicle.

This object may be suitably attained according to the principle of the present invention, which provides a steering control system for a vehicle, having a yaw rate sensor for detecting a yaw rate of the vehicle, an actuator electrically controlled to change a steering angle, of the vehicle, and a controller for controlling the actuator to control the steering angle of the vehicle on the basis of an input which includes at least a component derived from the yaw rate detected by the yaw rate sensor, wherein the controller comprises a detector for detecting an abnormality of a value of the yaw rate detected by the yaw rate sensor, and a limiter for limiting an amount of change in the steering angle of the vehicle to within a predetermined tolerable range when the abnormality is detected by the detector.

In the vehicle steering control system of the present invention constructed as described above, the amount of change of the steering angle of the vehicle to be controlled by the actuator electrically controlled by the controller is limited by the limiter to within a predetermined tolerable range if abnormality in the detected value of the yaw rate sensor is found by the detector. For instance, the detector determines the occurrence of abnormality of the detected yaw rate value, if the detected yaw rate value is different, by more than a predetermined amount, from an estimated value of the yaw rate which is obtained on the basis of the steering angle detected by a steering angle sensor, and a running speed of the vehicle detected by a vehicle speed sensor. Since the amount of change in the steering angle after the detection of the abnormality is limited to within the predetermined tolerable range, the steerability of the vehicle will not be appreciably deteriorated even in the presence of abnormality in the detected value of the yaw rate.

The controller preferably includes first, second and third determining means which perform the following functions. The first determining means is adapted to determine a provisional target value of the steering angle of the vehicle on the basis of the input to the controller, which input includes the component derived from the detected raw rate. The second determining means is adapted to determine the provisional target value as a final target value of the steering angle, if the abnormality is not detected by the detector. If the abnormality is detected by the detector, the third determining means determine the predetermined tolerable range of the amount of change in the steering angle of the vehicle on the basis of the provisional target value determined by the second determining means when or immediately after the abnormality is detected by the detector. The third determining means is also adapted to determine the provisional target value as the final target value if the provisional target value currently determined by the second determining means is held within the predetermined tolerable range, and determine as the final target value a predetermined value selected within the predetermined tolerable range if the currently determined provisional target value is outside the tolerable range.

In the above arrangement wherein the predetermined tolerable range is determined on the basis of the provisional target value of the yaw rate which is determined when the abnormality is detected, the amount of change of the steering angle after the detection of the abnormality is held relatively small. For example, the the upper limit of the determined tolerable range is used as the final target value if the currently determined provisional value is greater than the upper limit, while the lower limit of the tolerable range is used as the final target value if the currently determined provisional target value is smaller than the lower limit. Preferably, the intermediate point in the tolerable range defined by the upper and lower limits almost coincides with the provisional target value determined upon or immediately after the detection of the abnormality.

The principle of the present invention may be suitably embodied in the form of a steering control system for a motor vehicle having front and rear steering wheels. That is, the object of the invention indicated above may also be attained according to another aspect of this invention, which provides a steering control system for controlling a rear steering angle of a rear steering wheel of a motor vehicle, having a steering angle sensor for detecting a front steering angle of a front steering wheel of the vehicle, a yaw rate sensor for detecting a yaw rate of the vehicle, a vehicle speed sensor for detecting a running speed of the vehicle, an actuator electrically controlled to change the rear steering angle, and a controller for controlling the actuator to control the rear steering angle on the basis of an input which includes at least a component derived from the yaw rate detected by the yaw rate sensor, wherein the controller is adapted to perform the functions of: (a) determining a first gain and a second gain on the basis of the running speed of the vehicle detected by the vehicle speed sensor; (b) multiplying the detected front steering angle by the first gain to obtain a first product; (c) multiplying the detected yaw rate by the second gain to obtain a second product; (d) adding the first product to the second product to obtain a target value of the rear steering angle; and (e) controlling the actuator so that an actual value of the rear steering angle coincides with the target value, and wherein the controller is further adapted to perform the functions of: (f) determining the target value as a provisional target value of the rear steering angle if an abnormality is detected in a value of the yaw rate detected by the yaw rate sensor; (g) determining a predetermined tolerable range of the target value on the basis of the provisional target value determined immediately after the abnormality is detected; determining the provisional target value as a final target value if the provisional target value currently determined is held within the predetermined tolerable range; and (h) determining as the final target value a predetermined value selected within the predetermined tolerable range, the controller controlling the actuator according to the final target value to control the rear steering angle.

BRIEF DESCRIPTION OF THE DRAWINGS

The above and optional objects, features and advantages of the present invention will be better understood by reading the following detailed description of a presently preferred embodiment of the invention, when considered in conjunction with the accompanying drawings, in which:

FIGS. 10A and 10B are schematic block diagrams illustrating control process stages or functions performed by an electronic control unit of the control system of FIG. 9;

FIG. 14 is a graph for explaining an operation of an limiter 73–80 shown in FIG. 10a;

DETAILED DESCRIPTION OF THE PREFERRED EMBODIMENT

Figure 1:
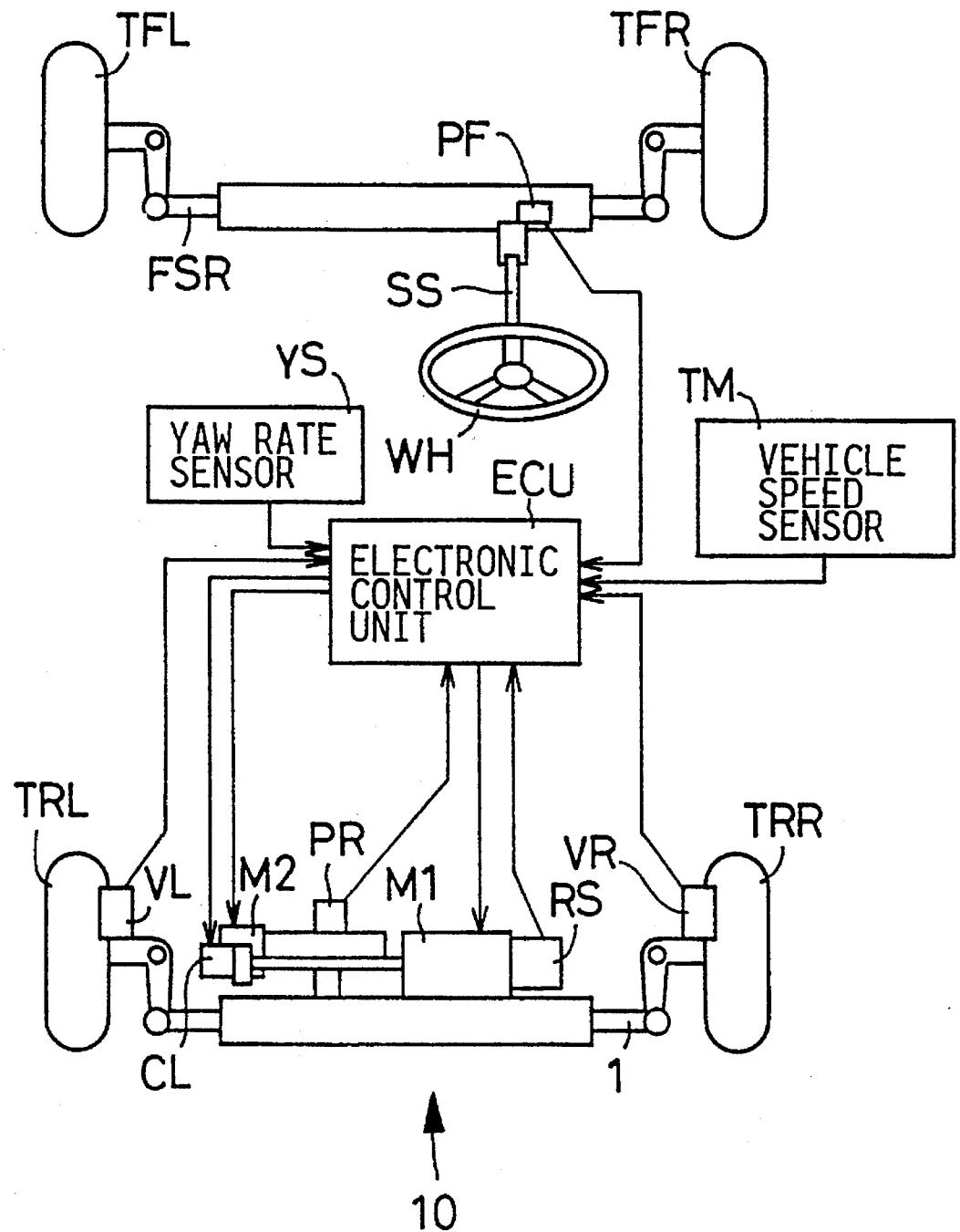
FIG. 1 is a schematic view showing an arrangement of one embodiment of a vehicle steering control system of the present invention.

Referring first to FIG. 1, there is shown a steering control system of a 4-wheel-steerable motor vehicle, which is constructed according to one embodiment of the present invention. The vehicle has front left and right steering wheels (or tires) TFL and TFR which are steerable by a driver of the vehicle through a steering wheel WH and a steering shaft SS. With the steering wheel WH turned by the vehicle driver, a rotary motion of the shaft SS connected to the wheel WH is converted by a well known rack-and-pinion mechanism into a linear motion of a steering rod FSR in the transverse direction of the vehicle, whereby the steering angle (hereinafter referred to as "front steering angle") of the front steering wheels TFL, TFR is changed depending upon the amount and direction of rotation of the wheel WH. The vehicle also has rear left and right steering wheels (or tires) TRL and TRR whose steering angle (hereinafter referred to as "rear steering angle") is controlled or adjusted automatically depending upon the front steering angle and the running speed of the vehicle.

The steering control system includes a front steering angle sensor PF near the pinion at the end of the steering shaft SS of the front steering mechanism. The sensor PF is provided to detect the front steering angle $\delta_F$ as controlled by the vehicle driver through the steering wheel WH. The construction of this sensor PF will be described in detail below. The steering control system also includes speed sensors VL and VR disposed near the respective rear left and right wheels TRL, TRR, to detect the rotating speeds of these rear wheels. The outputs of the speed sensors VL, VR are used to determine the running speed of the vehicle, which is used together with the front steering angle $\delta_F$ to control the rear steering angle $\delta_R$. The steering control system is also provided with a yaw rate sensor YS adapted to detect a yaw rate Ys of the vehicle. The detected yaw rate Ys is used for feedback control of the rear steering angle $\delta_R$, as discussed below in detail.

The rear steering mechanism, which is indicated generally at 10 in FIG. 1, uses an electric motor M1 for moving a rod 1 in the transverse direction of the vehicle to thereby change the rear steering angle $\delta_R$ of the rear steering wheels TRL, TRR. The motor M1 is backed up by a secondary or auxiliary electric motor M2, which is operated in the event of detection of any defect in connection with the primary electric motor M1. As described below, the auxiliary motor M2 is operatively connectable with the rod 1 through an electromagnetic clutch CL in the event of detection of such defect, so that the rear steering wheels TRL, TRR are returned to their neutral position. The rear steering mechanism 10 is provided with a rear steering angle sensor PR for detecting the rear steering angle $\delta_R$. The electric motor 1 is equipped with a rotary position sensor RS to detect the rotary position of its drive shaft. This sensor RS may be used to detect the rear steering angle $\delta_R$, as described below.

Figure 2:
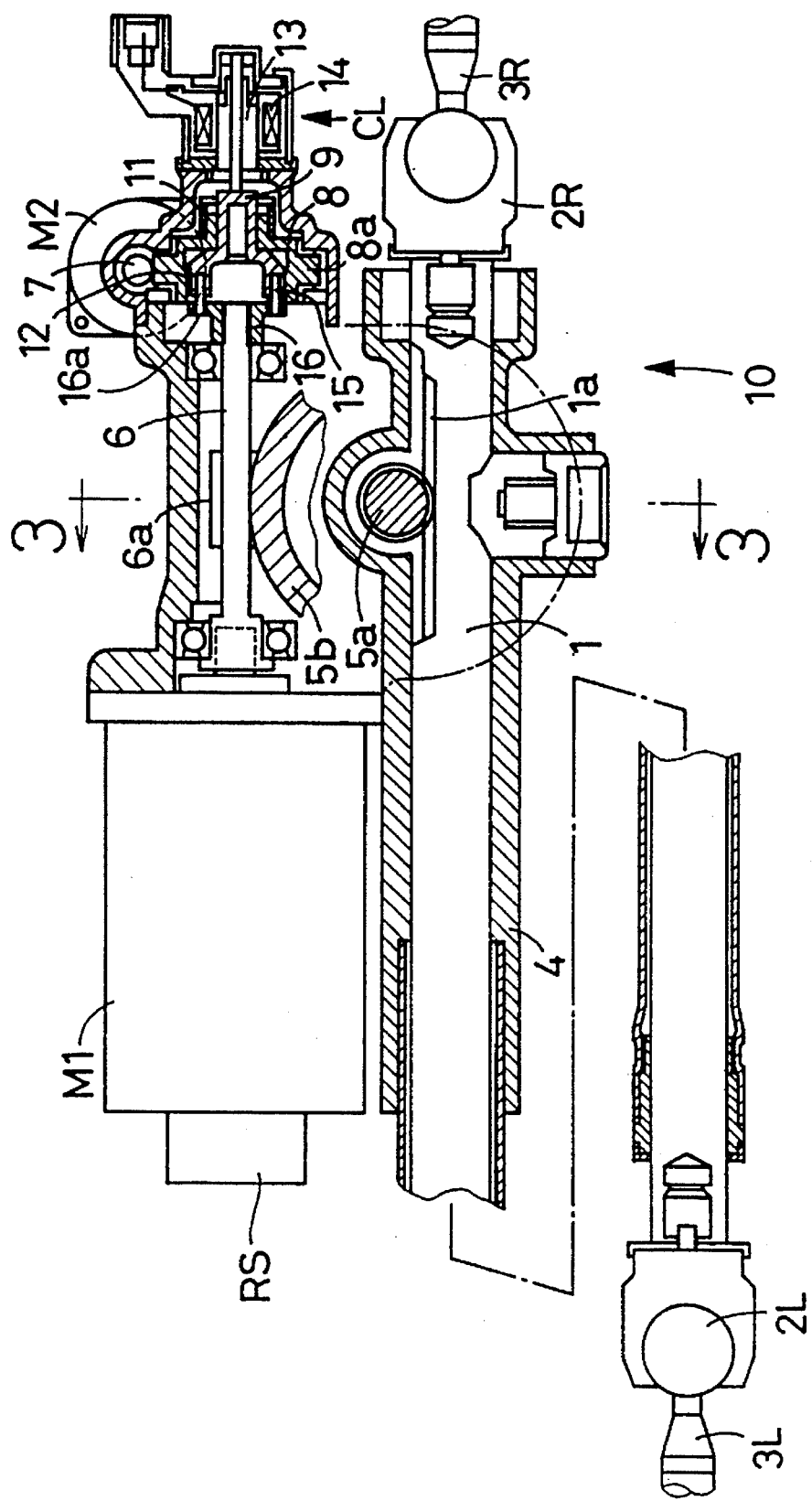
FIG. 2 is a fragmentary view partly in cross section of the rear steering mechanism of the vehicle, taken along line 2—2 of FIG. 4.
Figure 3:
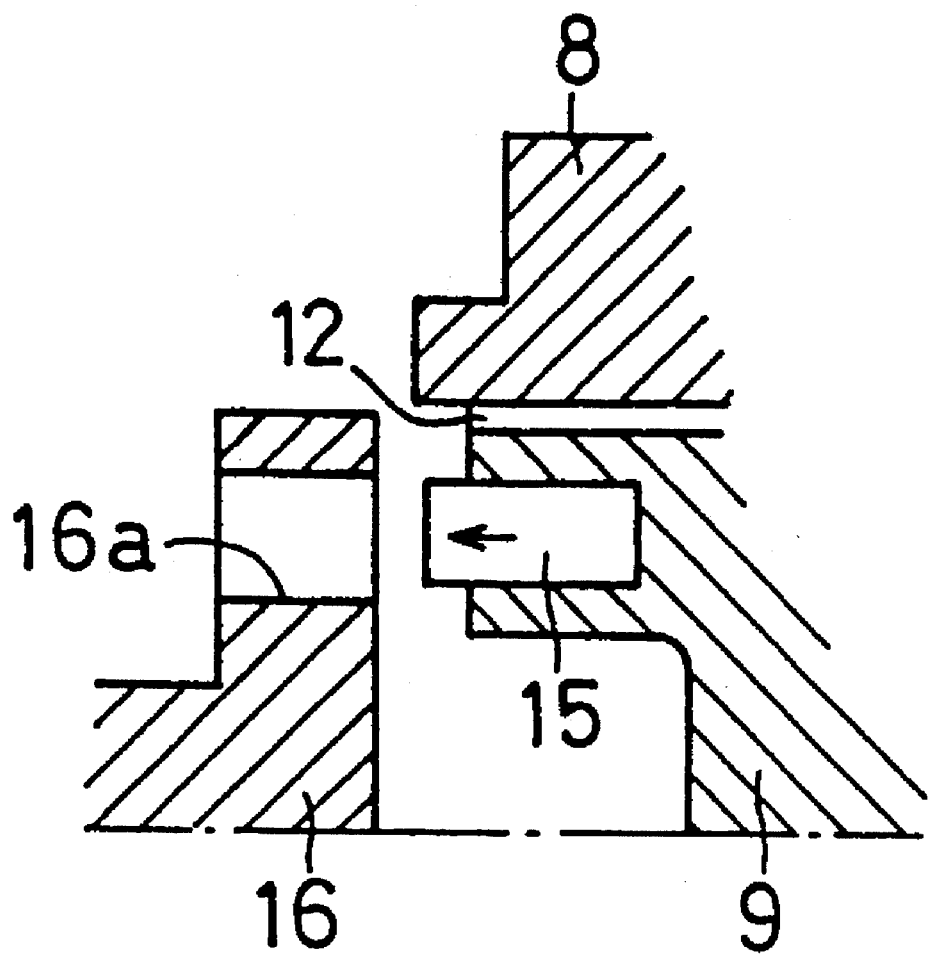
FIG. 3 is an enlarged view showing an electromagnetic clutch assembly incorporated in the rear steering mechanism.
Figure 4:
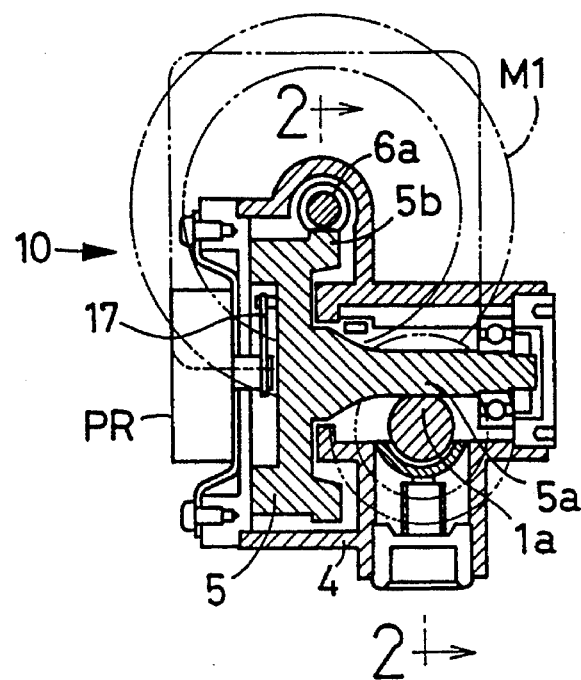
FIG. 4 is a cross sectional view taken along line 3—3 of FIG. 2.

Referring to FIGS. 2–4, the rod 1 of the rear steering mechanism 10 is connected through a ball joint 2L to a left knuckle arm 3L on the side of the rear left wheel TRL, and through a ball joint 3R to a right knuckle arm 3R on the side of the rear right wheel TRR. The rear wheels TRF, TRR are steered through the respective knuckle arms 3L, 3R. The rod 1 extends through and supported by a housing 4 fixed to the vehicle body, such that the rod 1 is movable in its longitudinal direction, i.e., in the transverse direction of the vehicle. A transverse movement of the rod 1 will cause a change in the rear steering angle $\delta_R$ through movements of the knuckle arms 3L, 3R. The rod 1 is operatively linked with the electric motor M1 through a transmission as described below, so that an operation of the motor M1 results in a transverse movement of the rod 1.

The rod 1 has a rack 1a which meshes with a pinion gear 5a. As shown in FIG. 4, the pinion gear 5a is formed with a rotary member 5, which also has a worm wheel 5b having a relatively large diameter. The worm wheel 5b meshes with a worm 6a formed on a drive shaft 6, as shown in FIG. 2. To the left end of the drive shaft 6, there is connected a drive shaft of the electric motor M1, so that a rotary motion of the motor M1 is transmitted to the rack 1a through the worm 6a, the worm wheel 5b meshing with the worm 6a, and the pinion gear 5a coaxial with the worm wheel 5b. Thus, the rack 1a is moved left or right depending upon the clockwise or counterclockwise direction of rotation of the motor M1, whereby the rear steering wheels TRL, TRR can be steered in the left or right direction.

The worm 6a and the worm wheel 5b are arranged so that the worm wheel 5b does not receive a large torque due to a reaction force produced upon steering movements of the rear wheels or tires TRL, TRR in contact with the road surface. That is, the gear ratio of the worm 6a and worm wheel 5b is determined so as to protect the electric motor M1 against the reaction force transmitted from the rear tires TRL, TRR.

To the right end of the drive shaft 6 as viewed in FIG. 2, there is connected a clutch assembly including the electromagnetic clutch CL indicated above, which in turn is operatively connected to the auxiliary electric motor M2. The drive shaft of the motor M2 has an integrally formed worm 7 which meshes with a worm wheel 8a of a rotary member 8. This rotary member 8 is a hollow member having a bore in which another rotary member 9 is disposed. As shown in FIG. 3, the inner circumferential surface of the rotary member 8 and the opposite outer circumferential surface of the rotary member 9 are splined to each other as indicated at 12, so that the two rotary members 8, 9 are rotated together and are axially movable relative to each other. It is noted that the inner rotary member 9 is axially movable relative to the outer rotary member 8 which is stationary in fixed connection to the housing 4.

A compression coil spring 11 is disposed around the circumference of a small-diameter portion of the outer rotary member 8, for biasing the inner rotary member 9 in the rightward direction as viewed in FIG. 2. A magnetic core 13 is fixed to the rotary member 9, and a coil winding 14 is disposed around the core 13, so that the rotary member 9 is axially moved against a biasing action of the spring 11 in the leftward direction, upon energization of the coil winding 14. The rotary member 9 has a plurality of pins 15 extending from its left end face in the leftward direction, as shown in FIG. 3. The pins 15 are adapted to be engageable with respective holes 16a formed through an outer flange of a connecting plate 16 fixed to the right end of the drive shaft 6.

While the coil winding 14 is in its de-energized state, the inner rotary member 9 is placed in its right or non-operated position in which the pins 15 are not engaged with the holes 16a. Upon energization of the coil 14, the inner rotary member 9 is axially moved to its left or operated position for engagement of the pins 15 with the respective holes 16a of the connecting plate 16, whereby the rotary member 9 is connected to the drive shaft 6 through the connecting plate 16. De-energizing the coil 14 will cause the rotary member 9 to be axially moved to its right non-operated position under the biasing action of the compression coil spring 11, whereby the pins 15 are disengaged from the connecting plate 16.

With the electric motor M2 turned on, the worm 7 is rotated, and the worm wheel 8a meshing with the worm 7 is rotated to rotate the rotary member 8, which in turn rotates the inner rotary member 9 through the spline 12. On the other hand, the energization of the coil winding 14 of the electromagnetic clutch CL and the resulting engagement of the pins 15 with the connecting plate 16 will cause the rotary motion of the rotary member 9 to be transmitted to the drive shaft 6, whereby the rod 1 is moved by the motor M2, as in the case of normal operation of the primary motor M1.

Since the motor M2 is operatively connected to the drive shaft 6 through the worm 7 and worm wheel 8a, a relatively small force is required to drive the drive shaft 6 when the motor M2 is operated, than when the motor M1 is operated. Conversely, a drive force generated by the motor M2 could be a considerably large force acting on the motor M1. However, the de-energization of the clutch CL disconnects the connecting plate 16 (namely, the drive shaft 6) from the rotary member 9 (namely, the motor M2). Thus, the motor M1 is protected against the drive forge produced by the motor M2, in the presence of the clutch CL which is normally held in the de-energized state. It is also noted that the speed reduction ratio associated with the electric motor M2 is determined to be higher than that associated with the motor M1. This means a comparatively slow steering action by the motor M2. However, since the motor M2 is used for the sole purpose of returning the rear steering wheels TRL, TRR to their neutral position in the event of detection of a defect or failure of the motor M1, a high operating response is not required with respect to the auxiliary motor M2.

Referring to FIG. 4, the rear steering angle sensor PR (potentiometer) is fixed to the housing 4, and the rotor of this sensor PR has an arm 17 fixed thereto such that the arm 17 is held in engagement with a hole formed in the rotary member 5. The sensor PR is used to detect the rear steering angle $\delta_R$, and the rotary position sensor RS is used to detect the angular position of the motor M1.

In the present embodiment, the motor M1 is a non-brush direct current motor, and the sensor RS produces a 3-phase pulse signal as the motor M1 is rotated.

Figure 6:
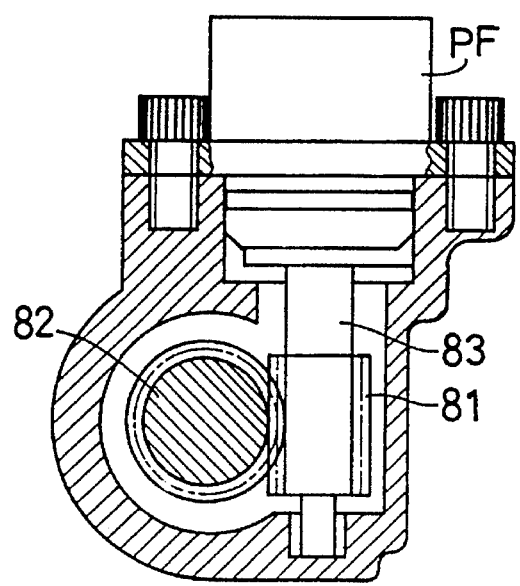
FIG. 6 is a cross sectional view taken along line A—A of FIG. 5.
Figure 5:
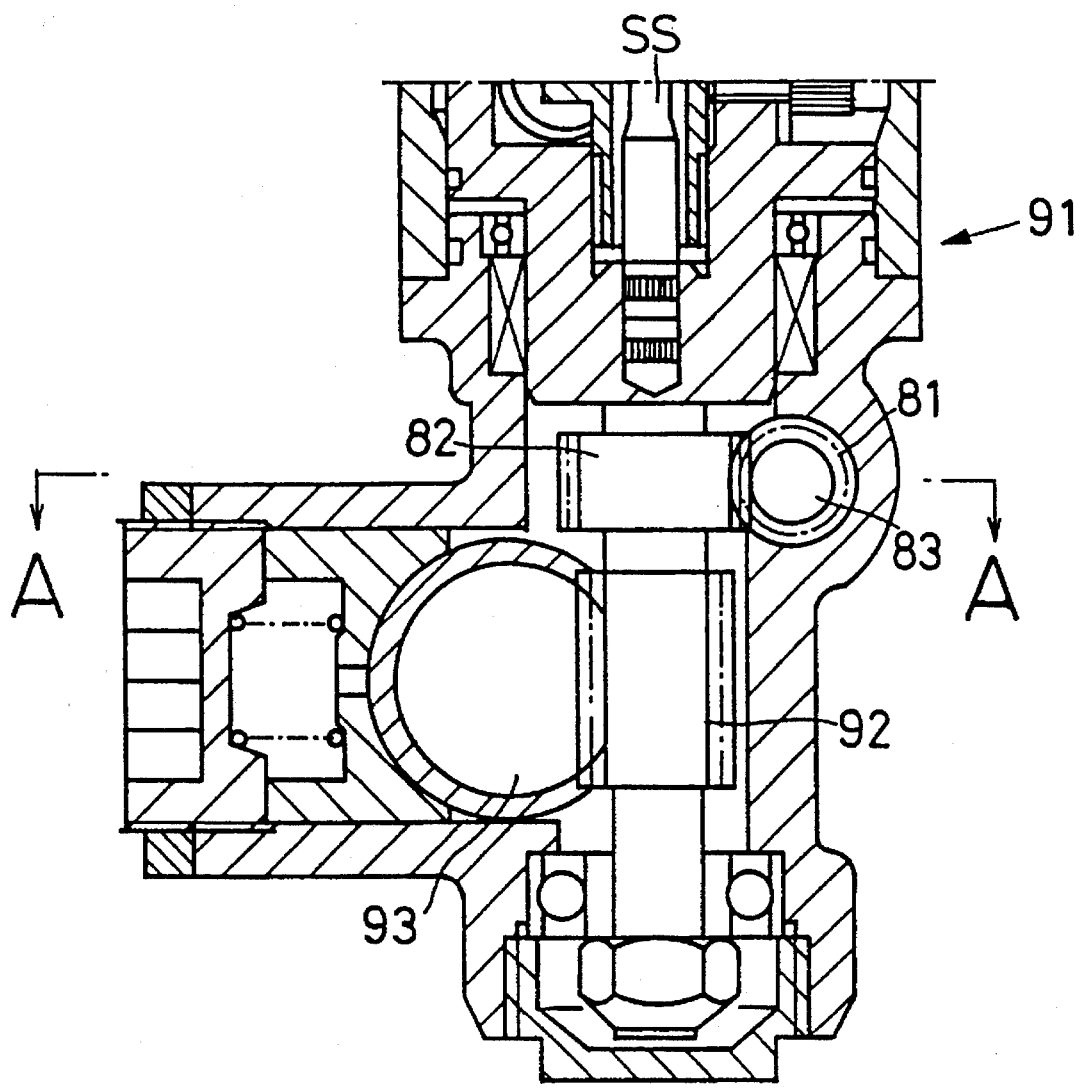
FIG. 5 is a view in longitudinal cross section of a steering gear box of the front steering mechanism.
Figure 7:
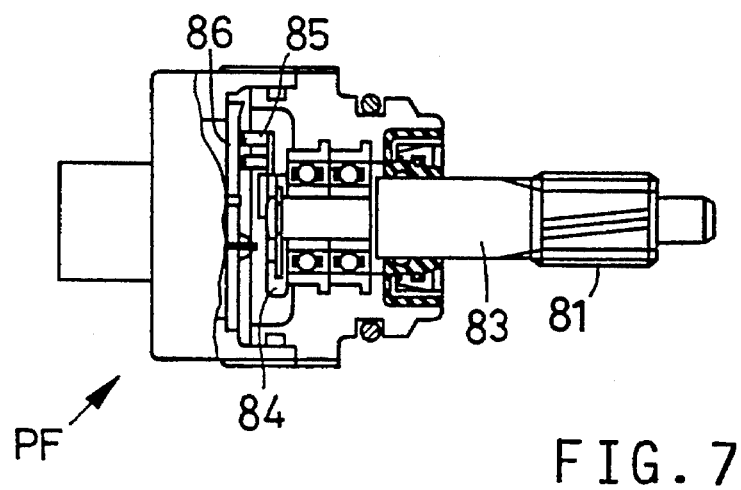
FIG. 7 is an enlarged fragmentary cross section view of a front steering angle sensor, also taken along line A—A of FIG. 5.
Figure 8:
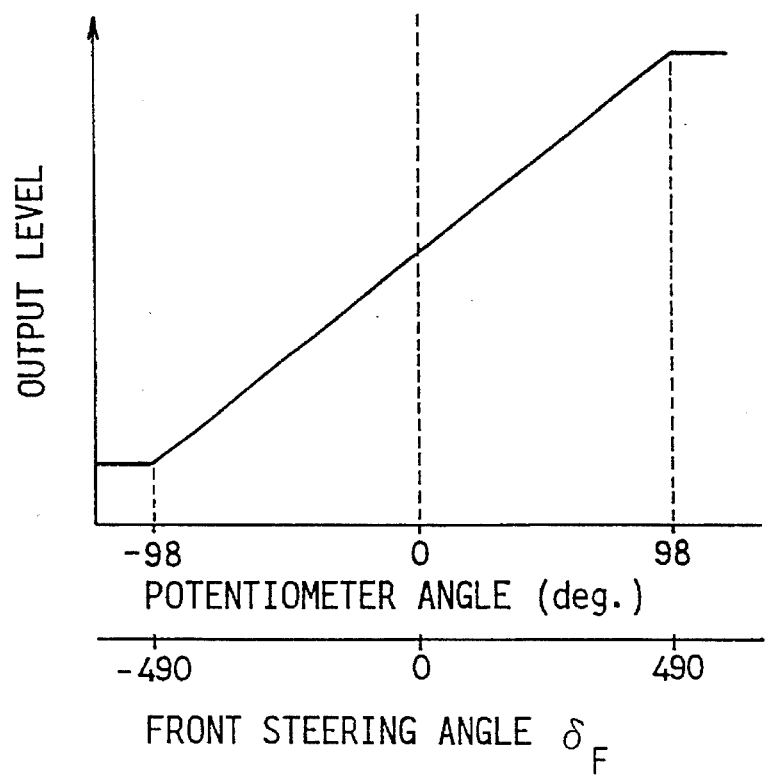
FIG. 8 is a graph indicating an example of the output characteristic of the front steering angle sensor of FIG. 7.

Referring to FIGS. 5–7, there will be described a portion of the steering gear box of the front steering mechanism, which is adjacent to the end portion of the steering shaft SS (FIG. 1), and the front steering angle sensor PF. Reference is first made to FIG. 5, the rack-and-pinion mechanism indicated above includes a rack 93 formed with the steering rod FSR (FIG. 1), and a pinion 92 connected to the steering shaft SS. The steering gear box has a power steering valve 91, and a worm 82 is disposed between the pinion 92 and the valve 91. The worm 82 meshes with a worm wheel 81 as most clearly shown in FIG. 6. The worm wheel 81 is supported by a shaft 83 to which is connected the front steering angle sensor PF, as shown in FIGS. 6 and 7. The sensor PF incorporates a potentiometer board 86, a brush holder 84, and contactors 85 for sliding contact with the board 86. As well known in the art, the board 85 has an electrical resistive coating which covers the contact surface with respect to the contactors 85, so that an output signal of the sensor PF is based on a change in the position at which each contactor 85 contacts the resistive coating on the board 86 during rotation of the shaft 83. Namely, the output signal represents the front steering angle $\delta_F$ of the front steering wheels or tires TFL, TFR. An example of the output characteristic of the sensor PF is indicated in the graph of FIG. 8.

Figure 9:
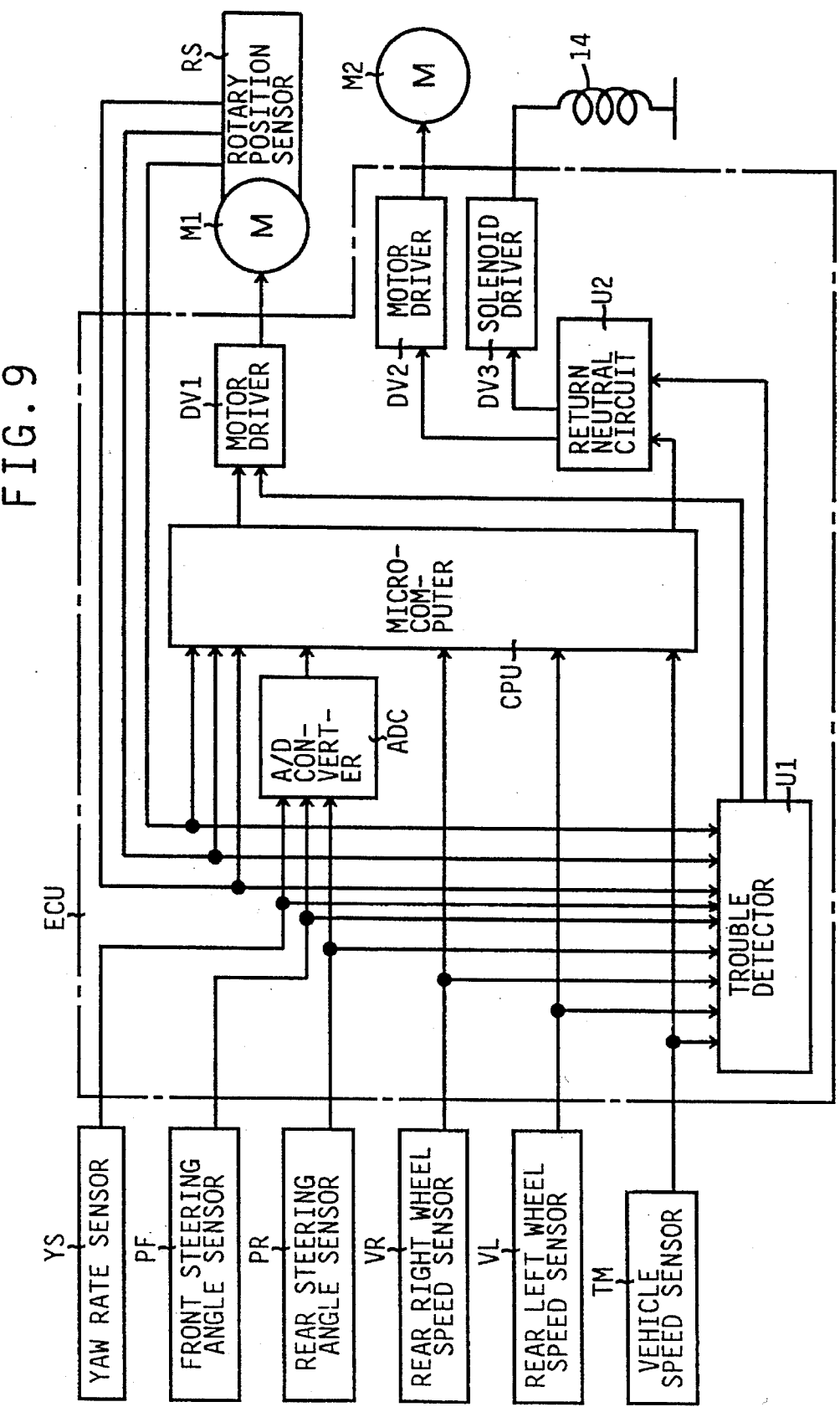
FIG. 9 is a schematic block diagram illustrating an electric control system for the steering control system of FIG. 1.

The present steering control system is controlled by an electronic control unit ECU shown in FIG. 9. The control unit ECU is adapted to receive the output signals of the yaw rate sensor YS, front steering angle sensor PF, rear steering angle sensor PR, right and left rear wheel speed sensors VR, VL, and a vehicle speed sensor TM whose output is used with the outputs of the wheel speed sensors VR, VL to determine a vehicle speed Vs as discussed below. The control unit ECU is also adapted to control the electric motors M1, M2 and the coil winding 14 for the electromagnetic clutch CL. In the present control system as shown in FIG. 9, the sensors PF, PR are both potentiometers, and the yaw rate sensor YS produces an analog voltage signal. Therefore, the control unit ECU uses an A/D converter ADC for converting the analog output signals of the sensors YS, PF, PR into digital signals to be received by a microcomputer CPU. The pulse signals of the sensors VR, VL, TM and RS are directly applied to the microcomputer CPU. The control unit ECU incorporates a trouble detector U1 for detecting any defects associated with the sensors PF, PR, VR, VL, TM, such as those caused by disconnection of conductors, shorting, and the like which require or result in energization of the auxiliary motor M2 and coil winding 14 of the clutch CL, as described below. The detector U1 are connected to all the sensors indicated above, as shown in FIG. 9.

It is noted that the detects indicated above should be distinguished from an abnormal output of the yaw rate sensor YS, which will be described with respect to a detector-limiter circuit 70 by reference to FIGS. 10A and 10B.

The trouble detector U1 is connected to a motor driver DV1 for energizing the motor M1, and to a RETURN NEUTRAL circuit U2, which in turn is connected to a motor driver DV2 for the auxiliary motor M2 and a coil driver DV3 for the coil winding 14. Upon detection of any defect by the trouble detector U1, the motor driver DV1 is inhibited from energizing the motor M1, and a RETURN NEUTRAL signal is applied to the RETURN NEUTRAL circuit U2. Upon reception of the RETURN NEUTRAL signal from the detector U1 or the microcomputer CPU, the circuit U2 energizes the auxiliary motor M2 and the coil winding 14 through the respective drivers DV2 and DV3, so that the rear steering wheels TRL, TRR are returned to their neutral position (at which the angle $\delta_R$ is substantially zero). Upon detection by the sensor PR of completion of the return of the rear wheels TRL, TRR to their neutral position, the microcomputer CPU applies a signal to the RETURN NEUTRAL circuit U2 to de-energize the motor M2 and coil winding 14.

Referring next to the block diagram of FIGS. 10A and 10B, there will be described the functions of the control unit ECU, most of which are performed according to control programs stored in the microcomputer CPU. While the block diagram of FIG. 9 show only one microcomputer (CPU) indicated by a single block, the control unit ECU may use two microcomputer units in combination for improving the data or signal processing function. Namely, one of the microcomputer units is assigned to produce a signal indicative of a target value $\delta_R^*$ of the rear steering angle $\delta_R$, while the other microcomputer unit is assigned to receive and process the signal of the target rear steering angle $\delta_R^*$ for generating a signal indicative of a duty-cycle ratio DUTY to be applied to a pulse width modulator (PWM) 45. The former microcomputer unit corresponds to blocks or stages 20, 50 and 70 shown in FIG. 10A, while the latter microcomputer unit corresponds to block or stage 60 (feedback controller) shown in FIG. 10B.

There will first be explained a routine for generating the target value $\delta_R^*$ of the rear steering angle $\delta_R$, which is applied to the feedback controller 60. Briefly described, a first product $(G_F \cdot \delta_F)$ associated with the front steering angle $\delta_F$ is obtained by multiplying the detected front steering angle $\delta_F$ by a first gain $G_F$ determined on the basis of the vehicle speed Vs, and a second product $(Gy \cdot Ys)$ associated with the vehicle yaw rate Ys is obtained by multiplying the detected yaw rate Ys by a second gain Gy determined on the basis of the vehicle speed Vs. These first and second products $(G_F \cdot \delta_F)$ and $(Gy \cdot Ys)$ are summed to obtain the target rear steering angle $\delta_R^*$. The first product is obtained by first product calculating means indicated at 20, while the second product is obtained by second product calculating means indicated at 50.

Described more specifically by reference to FIG. 10A, the output signal of the front steering angle sensor PF indicative of the front steering angle $\delta_F$ is applied to a converter 21B whose output is applied to a multiplier 23. The converter 21B is adapted to zero its output if the detected value or input $\delta_F$ is zero or a value near zero, and limit its output to a predetermined highest or lowest value if the input $\delta_F$ is higher than the highest value or lower than the lowest value. Thus, the converter 21B has a zeroing and limiting function. The width w of the zeroing range of the converter 21B as indicated by hatched lines is determined on the basis of the vehicle speed Vs by a converter 21A. The vehicle speed Vs is produced by a calculator 41 in which an average vehicle speed is determined from the rear wheel speeds detected by the sensors VL, VR and the vehicle speed detected by the sensor TM. The output of the calculator 41 is used as the vehicle speed Vs. The first gain $G_F$ is determined by a converter 22, on the basis of the received vehicle speed Vs. The outputs of the converters 21B and 22 are multiplied by each other by the multiplier 23 to obtain the first product $(G_F \cdot \delta_F)$.

On the other hand, the output signal of the yaw rate sensor YS indicative of the yaw rate Ys of the vehicle is applied to a converter 51 whose output is applied to a multiplier 53. The converter 51 is adapted to zero its output if the detected value or input Ys is zero or a value near zero, and limit its output to a predetermined highest or lowest value if the input $\delta_F$ is higher than the highest value or lower than the lowest value. Thus, the converter 51 also has a zeroing and limiting function. The zeroing width w of the zeroing range of the converter 21 as indicated by hatched lines is suitably determined by a converter similar to the converter 21A. The second gain Gy is obtained by a converter 52 on the basis of the input Vs. The output Gy of the converter 52 is applied to the multiplier 53 so that the output Ys of the converter 51 is multiplied by the second gain Gy to obtain the second product $(Gy \cdot Ys)$, which is added by an adder 54 to the first product $(G_F \cdot \delta_F)$ to obtain a sum $G_F \cdot \delta_F + Gy \cdot Ys = \delta_R^*$, that is the target rear steering angle indicated above. Normally, the output $\delta_R^*$ of the adder 54 is applied to the feedback controller 60 via the detector-limiter circuit 70 which will be described by reference to FIG. 10B.

Figure 11:
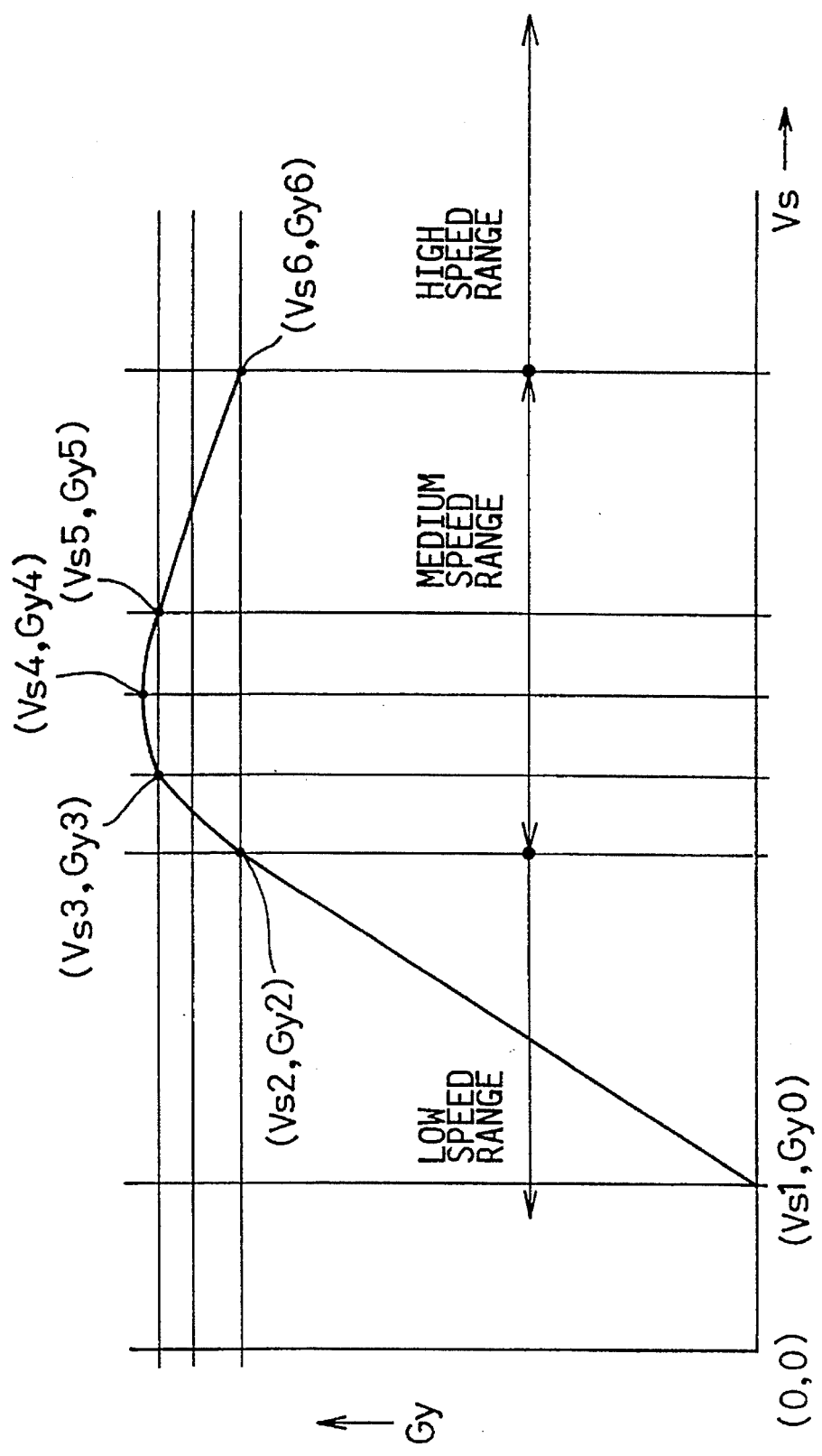
FIG. 11 is a graph indicating a Vs-Gy relationship used by a converter 52 shown in FIG. 10A.
Figure 12:
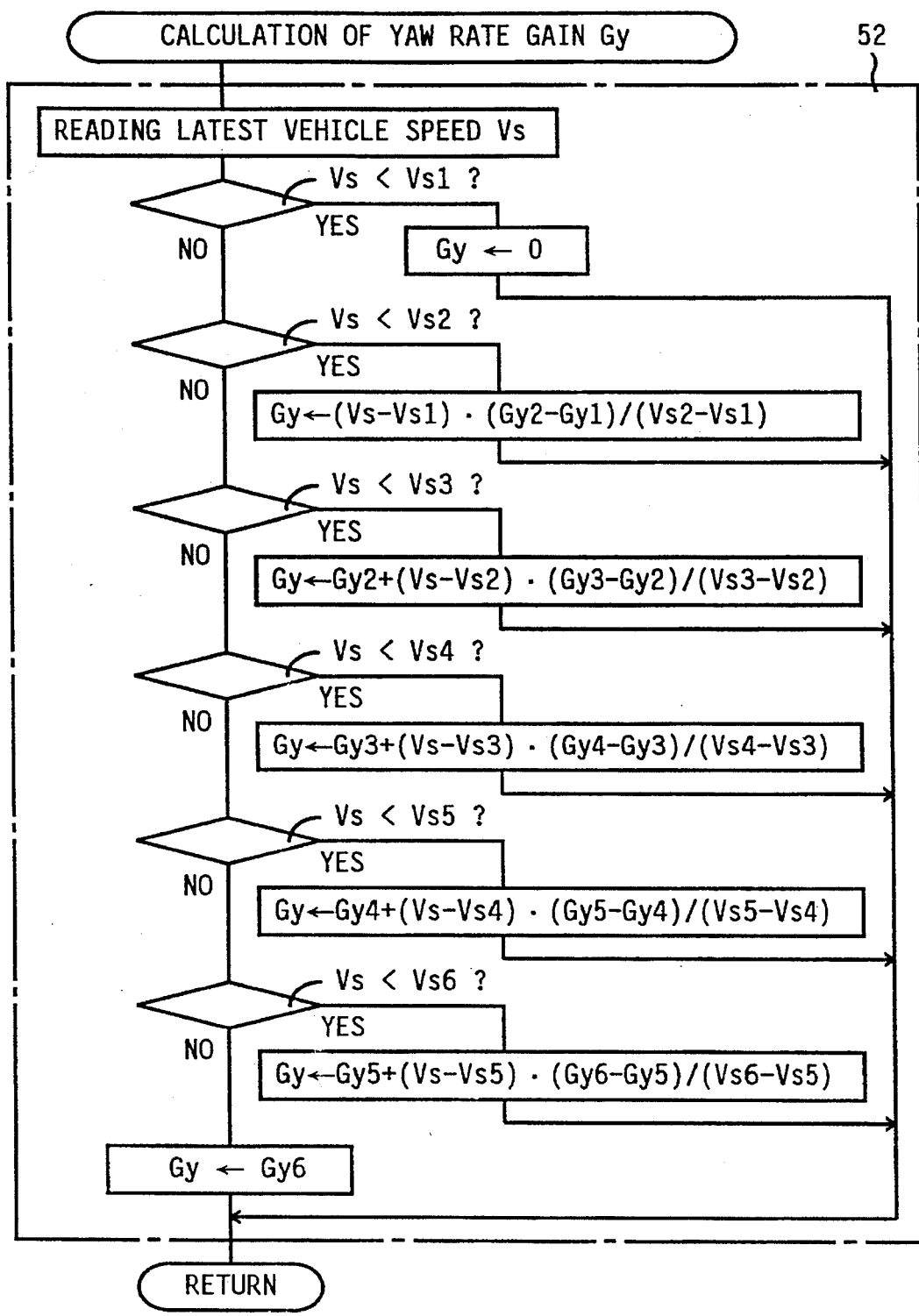
FIG. 12 is a flow chart illustrating a routine implemented by the converter 52 for calculating a gain Gy by interpolation.

The converter 52 for obtaining the second gain Gy applied to the multiplier 53 will be explained by reference to FIGS. 11 and 12. The converter 52 uses a predetermined Gy-Vs relationship for determining the gain Gy on the basis of the vehicle speed Vs. This relationship corresponds to a response characteristic of the yaw rate Ys with respect to a change in the front-steering angle $\delta_F$ on a specific vehicle. As indicated by the graph of FIG. 11, the gain Gy determined according to the predetermined relationship has a peak when the vehicle speed Vs is in a medium range. The relationship is determined depending upon the specific characteristics of the vehicle. The microcomputer CPU stores Vs-Gy data representative of six Vs-Gy relationship points (Vs1,Gy0) through (Vs6,Gy6), and calculates the second gain Gy (yaw rate gain) on the basis of the vehicle speed Vs, by interpolation using these six points. The routine to calculate the gain Gy by the interpolation is illustrated in the flow chart of FIG. 12. The routine is formulated to first read the vehicle speed Vs currently obtained by the calculator 41, and then determine one of the seven speed ranges in which the current speed Vs falls, by comparing the value Vs with the stored values Vs1–Vs6. If the vehicle speed Vs is zero, the gain Gy is set to zero. If the speed Vs is higher than the value Vs6, the gain Gy is limited to the corresponding value Gy6. When the value Vs is between any adjacent ones of the six values Vs1–Vs6, the appropriate interpolating equation is selected to calculate the gain Gy.

Referring back to FIG. 10A, the graph given in the converter block 21A represents a predetermined Vs-w relationship used by the converter 21A to determine the width w of the zeroing range used by the converter 21B, on the basis of the vehicle speed Vs. The converter 21A applies a signal indicative of the width w to the converter 21B so that the converter 21B zeroes its output if the input $\delta_F$ falls within the zeroing range having the width w. Similarly, the graph given in the converter block 22 represents a predetermined Vs-$G_F$ relationship for determining the first gain $G_F$ on the basis of the vehicle speed Vs, so that the determined gain $G_F$ is used by the multiplier 23 to calculate the first product $(G_F \cdot \delta_F)$. The Vs-$G_F$ relationship is formulated such that the gain $G_F$ is zero when the input Vs has a predetermined value, and such that the gain $G_F$ is a positive value when the input Vs is larger than the predetermined value, and a negative value when the input Vs is smaller than the predetermined value. A negative value of the gain $G_F$ results in the target rear steering angle $\delta_R^*$ which causes the rear steering wheels TRL, TRR to be steered in a direction opposite to the steering direction of the front steering wheels TFL, TFR. Conversely, a positive value of the gain $G_F$ results in the target rear steering angle $\delta_R^*$ which causes the rear steering wheels TRL, TRR to be steered in the same direction as the front steering wheels TFL, TFR. According to this arrangement, the vehicle is likely to be turned in the steering direction of the front wheels TFL, TFR when the vehicle speed Vs is lower than the predetermined value, that is, when the gain $G_F$ is negative. In other words, the vehicle is less likely to be turned in the front steering direction when the vehicle speed Vs is relatively high (higher than the predetermined value). Thus, the first product $G_F \cdot \delta_F$ applied to the adder 54 is either positive or negative.

The second product $Gy \cdot Ys$ also applied to the adder 54 is also either positive or negative, depending upon the sign of the yaw rate Ys applied to the converter 51, that is, depending upon the steering direction of the front wheels TFL, TFR. The second product Gy·Ys causes the target rear steering angle $\delta_R{}^*$ to change in the direction which reduces the yaw rate Ys of the vehicle, by changing the rear steering angle $\delta_R$ so that the angle $\delta_R$ approaches the front steering angle $\delta_F$. The output of the adder 54, that is, the obtained target rear steering angle $\delta_R{}^*$ is applied to the detector-limiter 70. The rear steering wheels TRL, TRR are steered clockwise when the value $\delta_R{}^*$ changes in the positive direction, for instance, when the positive value $\delta_R{}^*$ increases.

Figure 13:
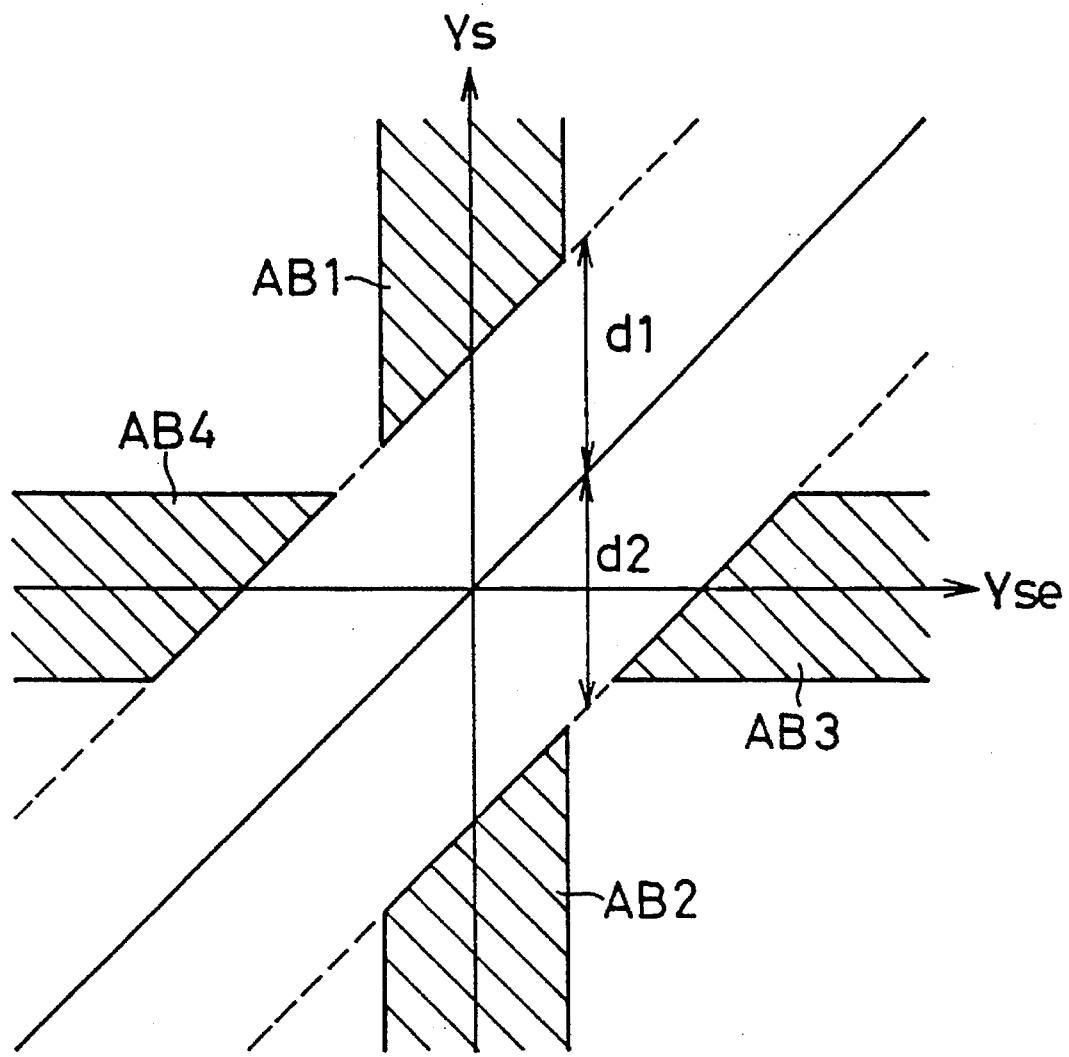
FIG. 13 is a view for explaining an operation of an abnormality detector 72 shown in FIG. 10A.

The detector-limiter 70 is adapted to apply the target rear steering angle $\delta_R{}^*$ as received from the adder 54 to the feedback controller 60 through a switch 80, when a detector 71, 72 determines that the output signal of the yaw rate sensor YS indicative of the yaw rate Ys is normal. The detector 71, 72 includes a calculator 71 for obtaining an estimated yaw rate value Yse on the basis of the detected front steering angle $\delta_F$ and the calculated vehicle speed Vs. The estimated yaw rate value Yse is applied to a judging stage 72 in which the output Ys of the yaw rate sensor YS is compared with the estimated yaw rate value Yse, and judges whether the input Ys received from the sensor YS is normal or abnormal. In principle, the element 72 determines that the input Ys is abnormal if the absolute value |Yse| of the estimated yaw rate Yse is considerably large while the absolute value |Ys| of the actual input Ys is almost zero or near zero, or if the absolute value |Yse| is almost zero while the absolute value |Ys| is considerably large. Described more specifically by reference to FIG. 13, the element 72 determines that the output Ys of the yaw rate sensor YS is abnormal if a difference between the absolute values |Ys| and |Yse| is greater than a predetermined value d1 or d2. The value d1 and d2 may be the same value. As indicated at AB1 through AB4, there are four cases of abnormality. In the cases AB1 and AB2, the absolute value |Ys| of the detected yaw rate Ys is greater than the absolute value |Yse| of the estimated yaw rate value Yse, by more than the predetermined amount d1 or d2, while the absolute value |Yse| is almost zero or near zero. In the cases AB3 and AB4, the absolute value |Ys| is almost zero or near zero, while the absolute value |Yse| is greater than the absolute value |Ys| by more than the predetermined amount.

Figure 14:
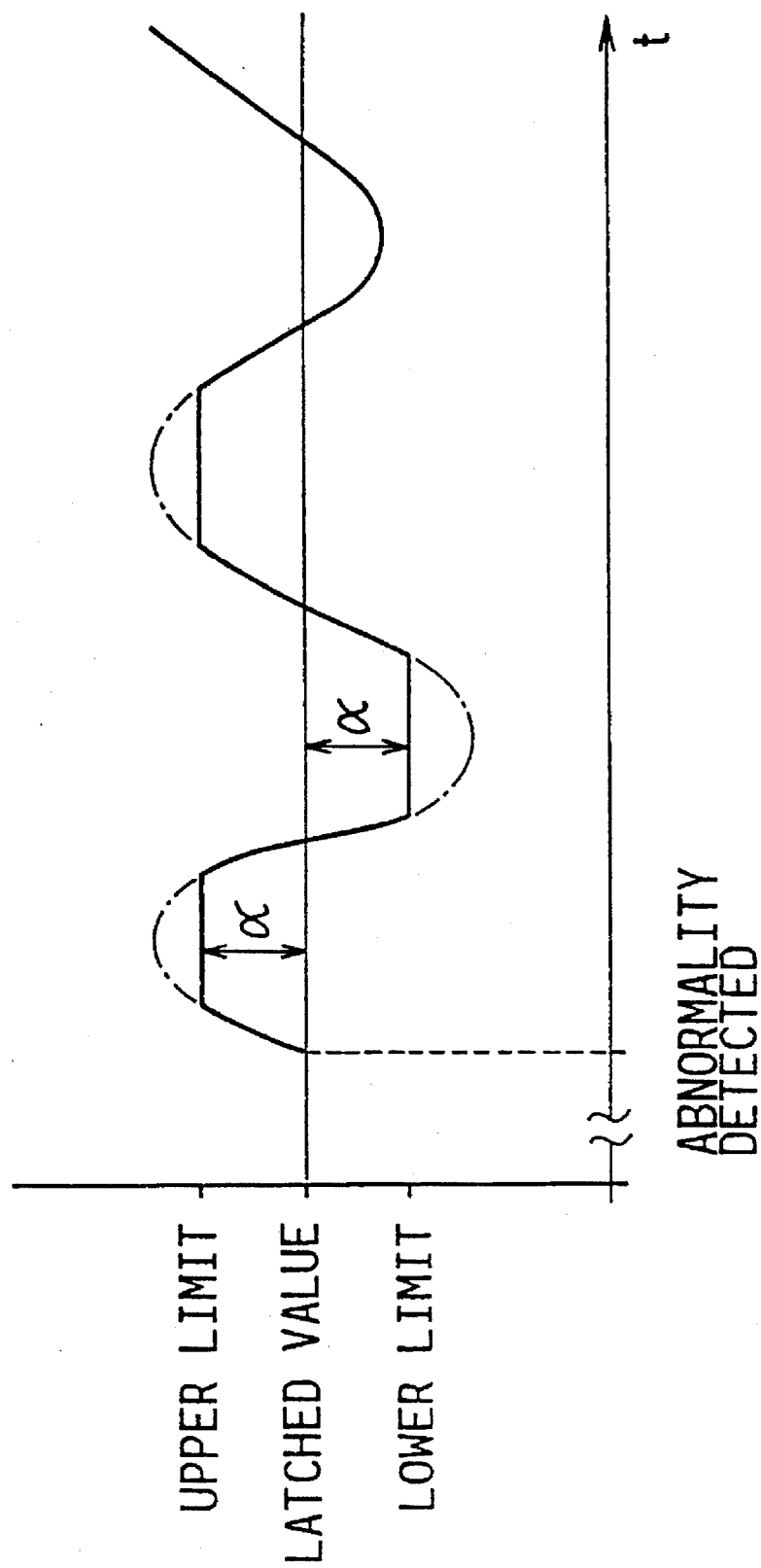

In the event of detection of abnormality of the detected yaw rate Ys, the element 72 generates a signal applied to a latch 73 and the switch 80. This signal causes the latch 73 to store the target rear steering angle $\delta_R{}^*$ currently received from the adder 54, that is, the value $\delta_R{}^*$ upon detection of the abnormality by the detector 71, 72. The same signal is also used to operate the switch 80 to a position for connecting output switches 78 and 79 to the feedback controller 60. Normally, the switch 80 is held in a position for connecting the adder 54 to the feedback controller 60. Thus, the switch 80 is controlled by the signal generated by the element 72. The switches 78 and 79 are controlled by the outputs of respective comparators 76, 77, so that either the output $\delta_R{}^*$ of the adder 54 or an output SGup or SGlo of an adder 74 or a subtracter 75 is selectively applied to the feedback controller 60 through the switch 80. The comparator 76 receives the output (target rear steering angle $\delta_R{}^*$) of the adder 54, and the output SGup of the adder 74 indicative of a sum of the output of the latch 73 and a predetermined value $\alpha$. This sum (latched $\delta_R{}^*+\alpha$) is an upper limit of the output $\delta_R{}^*$ of the adder 54, as indicated in FIG. 14. The comparator 77 receives the output of the adder 54, and the output SGlo of the subtracter 75 which is the output of the latch 73 (latched $\delta_R{}^*$) minus the predetermined value $\alpha$. This difference (latched $\delta_R{}^*-\alpha$) is a lower limit of the output $\delta_R{}^*$ of the adder 54, as also indicated in FIG. 14.

The elements 73 through 79 described above constitute a limiter for limiting an amount of change in the rear steering angle $\delta_R$ to within a predetermined tolerable range defined by the above-indicated upper and lower limits, when abnormality associated with the output Ys of the sensor YS is detected by the detector 71, 72. More particularly described, the limiter 73–79 is adapted to apply the output $\delta_R{}^*$ of the adder 54 if this output falls within the tolerable range, namely, not higher than the upper limit (latched $\delta_R{}^*+\alpha$) and not lower than the lower limit (latched $\delta_R{}^*-\alpha$). The latched value $\delta_R{}^*$ is the value $\delta_R{}^*$ detected at the moment when the abnormality is detected by the element 72. However, if the output $\delta_R{}^*$ of the adder 54 is higher than the upper limit, the switch 78 is operated by the output of the comparator 76, to apply the output SGup (indicative of the upper limit) of the adder 74 to the feedback controller 60 through the switches 79 and 80. If the output $\delta_R{}^*$ of the adder 54 is lower than the lower limit, the switch 79 is operated by the output of the comparator 77, to apply the output SGlo (indicative of the lower limit) of the subtracter 75 to the feedback controller 60 through the switch 80.

Thus, the detector-limiter 70 is adapted to monitor the detected yaw rate Ys as applied to the element 72 of the detector 71, 72, for detecting an abnormal value of the yaw rate Ys (abnormal level of the output signal of the sensor YS). In the event of detection of an abnormal value of the yaw rate Ys, the detector 71, 72 activates the latch 73 to latch the current output $\delta_R{}^*$ of the adder 54, and operates the switch 80 for connection of the switches 78, 79 to the feedback controller 60. The limiter 73–79 of the detector-limiter 70 is adapted to apply the currently obtained output $\delta_R{}^*$ of the adder 54 to the feedback controller 60 while the output $\delta_R{}^*$ is held within the predetermined tolerable range (latched $\delta_R{}^*\pm\alpha$), even if the abnormality exists, but limit the target rear steering angle $\delta_R{}^*$ to be applied to the controller 60, to the upper or lower limit if the output $\delta_R{}^*$ is higher than the upper limit or lower than the lower limit.

The feedback controller 60 which receives the output $\delta_R{}^*$ of the detector-limiter 70 through the output switch 80 will be described by reference to FIG. 10B.

The controller 60 is adapted to generate a control signal C for controlling the motor M1, on the basis of the received target rear steering angle $\delta_R{}^*$ and an error $\Delta\delta_R$ which is a difference between the target rear steering angle $\delta_R{}^*$ and the rear steering angle $\delta_R$ obtained by a steering angle converter 46. The controller 60 incorporates a differential control portion 61 and a proportional control portion 62. The differential control portion 61 provides an output $G_D \cdot d\Delta$, while the proportional control portion 62 provides an output $G_P \cdot \Delta\delta_R$. These two outputs $G_D \cdot d\Delta$ and $G_P \cdot \Delta\delta_R$ are applied to an adder 35 to obtain the control signal C.

In the proportional control portion 62, the input $\Delta\delta_R$ is applied to a converter 31B which has a zeroing and limiting function as explained above with respect to the converter 21B. The output of the converter 31B is applied to a multiplier 36, which multiplies the received output $\Delta\delta_R$ of the converter 31B by a predetermined gain or constant $G_P$, to provide the output $G_P \cdot \Delta\delta_R$.

In the differential control portion 61, the input $\Delta\delta_R$ is applied to a converter 31A similar to the converter 31B. The output $\Delta\delta_R$ of the converter 31A is applied to a delay stage or element 32 and a subtracter 33. The delay element 32 applies to the subtracter 33 a value of the output $\Delta\delta_R$ of the converter 31A which was received by the element 32 a predetermined time before. Thus, the output of the subtracter 33 represents a difference $d\Delta\delta_R$ per the predetermined time, which means a rate of change in the $\Delta\delta_R$. This output $d\Delta\delta_R$ of the subtracter 33 is applied to a multiplier 34, which multiplies the received value $d\Delta\delta_R$ by a differential gain $G_D$ to obtain the output $G_D \cdot d\Delta$ of the differential control portion 61.

The differential gain $G_D$ is obtained from a converter 39 which uses a predetermined relationship between the differential gain $G_D$ and an absolute value of a rate of change $d\delta_R*$ in the target rear steering angle $\delta_R*$. This rate of change $d\delta_R*$ is obtained by a subtracter 38 which receives the target rear steering angle $\delta_R*$ and an output of a delay stage or element 37. Like the element 32, the element 37 delays the input $\delta_R*$ by the predetermine time. Thus, the differential gain $G_D$ is determined on the basis of the rate of change $d\delta_R*$.

As in the blocks 21A, 21B, 22, 51 and 52 described above, the outputs of the corresponding converters are taken along the vertical axis of the graphs given in the blocks 31A, 31B and 39. The width of the zeroing range of the converters 31A, 31B is determined or set by a Vs-w converter 42, which receives the vehicle speed Vs from the average vehicle speed calculator 41. The function of this converter 42 is similar to that of the Vs-w converter 21A for the converter 21B. The functions of the converters 21A, 21B, 31A, 31B and 42 will be described by reference to the flow chart of FIG. 15, which illustrates a routine executed by the microcomputer CPU to determine the widths w of the zeroing ranges of the converters 21B, 31A, 31B, and perform the zeroing and limiting functions.

Initially, step S10 is implemented to read the latest vehicle speed Vs (present output of the calculator 41). Then, steps S20, S30 and S40 are sequentially implemented to determine the width values w of the zeroing ranges used by the converters 21B, 31A, 31B. These steps S10–S40 correspond to the functions of the Vs-w converter 21A and 42. The manner of determining the zeroing width w will be described below by reference to FIG. 16.

Figure 16:
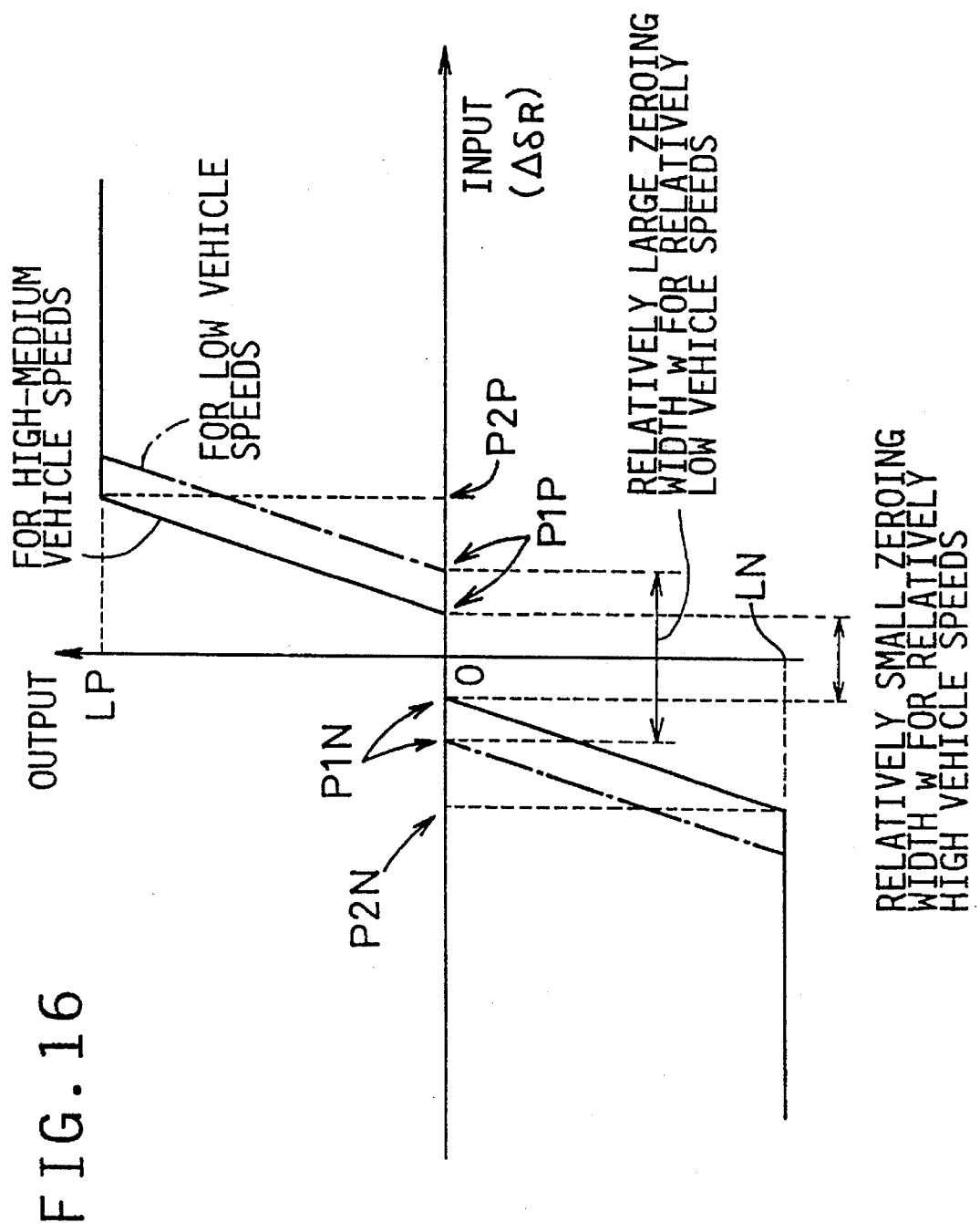
FIG. 16 is a graph for explaining an operating characteristic of the converter 31A.

The graph of FIG. 16 shows two different input-output relationships used by the converter 31A, by way of example. The relationship indicated by solid line has a relatively small zeroing width w (determined by the Vs-w converter 42) and is used when the vehicle speed Vs is relatively high (in a high-medium range). The relationship indicated by one-dot chain line has a relatively large zeroing width w (also determined by the converter 42) and is used when the vehicle speed Vs is relatively low (in a low range). The zeroing width is defined by two points P1P and P1N, and the gradient of the linearly proportional relationship between the input ($\Delta\delta_R$) and the output (input to the delay element 32 and subtracter 33) in the positive area of the input (error value $\Delta\delta_R$) is defined by the points P1P and P2P and an upper limit LP of the output, while the gradient in the negative area of the input is defined by the points P1N and P2N and a lower limit LN of the output. The output of the converter 31A is limited to the upper limit LP when the input $\Delta\delta_R$ is larger than the upper limit LP, and to the lower limit LN when the input is smaller than the lower limit LN.

Thus, the converter 31A whose operating characteristics are determined by the Vs-w converter 42 is adapted such that the output of the converter 31A is zero to zero the output of the differential control portion 61 when the input $\Delta\delta_R$ ($=\delta_R-\delta_R*$) is within the zeroing range between the points P1P and P1N. The operating characteristics of the converter 31B of the proportional control portion 62 and the converter 21B of the first product calculating means 20 are similar to those of the converter 31A as illustrated in FIG. 16.

As indicated above, the zeroing width w used by the converters 31A and 31B is extended when the vehicle speed Vs is relatively low. Accordingly, the feedback controller 60 is less likely to respond to a change in the error or difference $\Delta\delta_R$ of the rear steering angle $\delta R$ with respect to the target rear steering angle $\delta_R*$, that is, a change in the front steering angle $\delta_F$ which affects the error $\Delta\delta_R$ and which takes place as a result of manipulation of the steering wheel WH by the vehicle driver. Namely, when the steering wheel WH is manipulated at a relatively high frequency at a considerably low vehicle speed Vs, the opportunity of energization of the motor M1 of the rear steering mechanism is lowered, or at least the amount of change in the rear steering angle $\delta_R$ is comparatively limited, due to the relatively wide zeroing range used in the converters 31A, 31B. This facilitates the turning of the vehicle at a low vehicle speed Vs, with a relatively large difference between the front and rear steering angles $\delta_F$ and $\delta_R$.

When the vehicle is running at a relatively high speed Vs, on the other hand, the rear steering angle $\delta_R$ tends to be changed in the same direction as the front steering angle $\delta_F$ as the front steering angle is changed. This means a tendency of reducing a difference between the front and rear steering angles $\delta_F$ and $\delta_R$, which results in a tendency of reducing the yawing of the vehicle.

Figure 15:
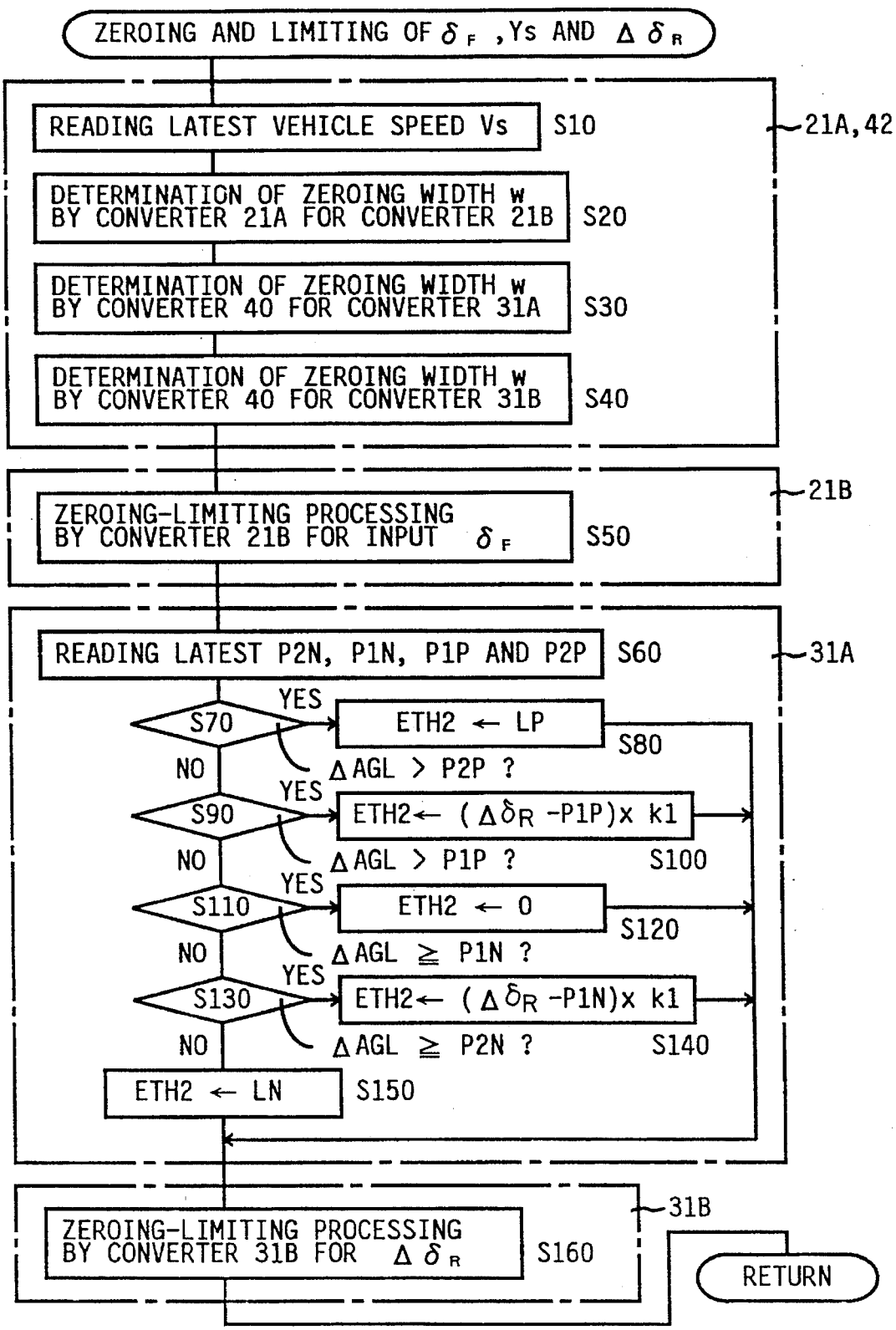
FIG. 15 is a flow chart illustrating operations of converters 21A, 21B, 22, 31A, 31B, 42 shown in FIGS. 10A and 10B.

Referring back to the flow chart of FIG. 15, step S40 is followed step S50 which corresponds to the converter 21B and in which the detected front steering angle $\delta_F$ is subjected to the zeroing and limiting processing. Step S50 is followed by step S60 to read the latest data indicative of the points P2N, P1N, P1P and P2P which define the width value w of the zeroing range used by the converter 31A. Then, decision steps S70, S90, S110, S130 are implemented to compare the input $\Delta\delta_R$ with the values P2P, P1P, P1N and P2N, in order to determine or calculate an output, ETH2. More specifically, if the input is larger than P2P (if an affirmative decision is obtained in step S70), step S80 is implemented to set the output to the upper limit LP. If the input is between P2P and P1P (if an affirmative decision is obtained in step S90), step S100 is implemented to set the output to ($\Delta\delta_R-$P1P)×k1. The value k1 is a constant representing the proportional gradient. If the input is between P1P and P1N (if an affirmative decision is obtained in step S110), step S120 is implemented to zero the output. If the input is between P1N and P2N (if an affirmative decision is obtained in step S130), step S140 is implemented to set the output to ($\Delta\delta_R-$P1N)×k1. If the input is smaller than P2N (if a negative decision is obtained in step S130), step S150 is implemented to set the output to the lower limit LN.

The steps S60–S150 corresponds to the converter 31A. Step S150 is followed by step S160 which corresponds to the converter 31B and in which the input $\Delta\delta_R$ is subjected to the zeroing and limiting processing as described above with respect to the converter 31A. However, suitable modifications are made in step S160 for proportional control by the proportional control portion 62 to provide the output $G_P \cdot \Delta\delta_R$.

The output C of the adder 35 which consists of the outputs of the multipliers 34 and 36 of the differential and proportional control portions 61, 62 is applied to a converter 43 which serves as a limiter, and the output of the converter or limiter 43 is applied to a converter 44 which converts its input into a duty-cycle ratio DUTY to be applied to a pulse width modulator 45. This modulator 45 applies to the motor driver DV1 a pulse signal corresponding to the duty-cycle ratio DUTY, so that the driver DV1 is energized with the duty-cycle ratio DUTY, whereby the motor M1 is operated. The rotary position sensor RS generates a 3-phase pulse signal indicative of the rotary position of the motor M1, which is applied to a converter 46, namely, the rotating direction and amount of the motor M1. Based on the pulse signal from the sensor RS, the converter 46 calculates the rear steering angle $\delta_R$ of the rear steering wheels TRL, TRR. In this respect, it is noted that the rotary position sensor RS is calibrated based on the output signal of the rear steering angle sensor PR, so that the pulse signal produced by the sensor RS can be accurately converted by the converter 46 into the rear steering angle $\delta_R$. The output $\delta_R$ of the converter 46 is applied to a subtracter 47 which generates the error $\Delta\delta_R$ of the detected angle $\delta_R$ with respect to the target angle $\delta_R^*$.

While the illustrated embodiment described above is adapted such that the converters 21A, 21B, 22, 31A, 31B, 51 and 52 determine their output values by calculation, the conversion of the input values into the corresponding output values may be made by using data map representative of relationships between a larger number of input values and the corresponding output values.

Figure 10B:
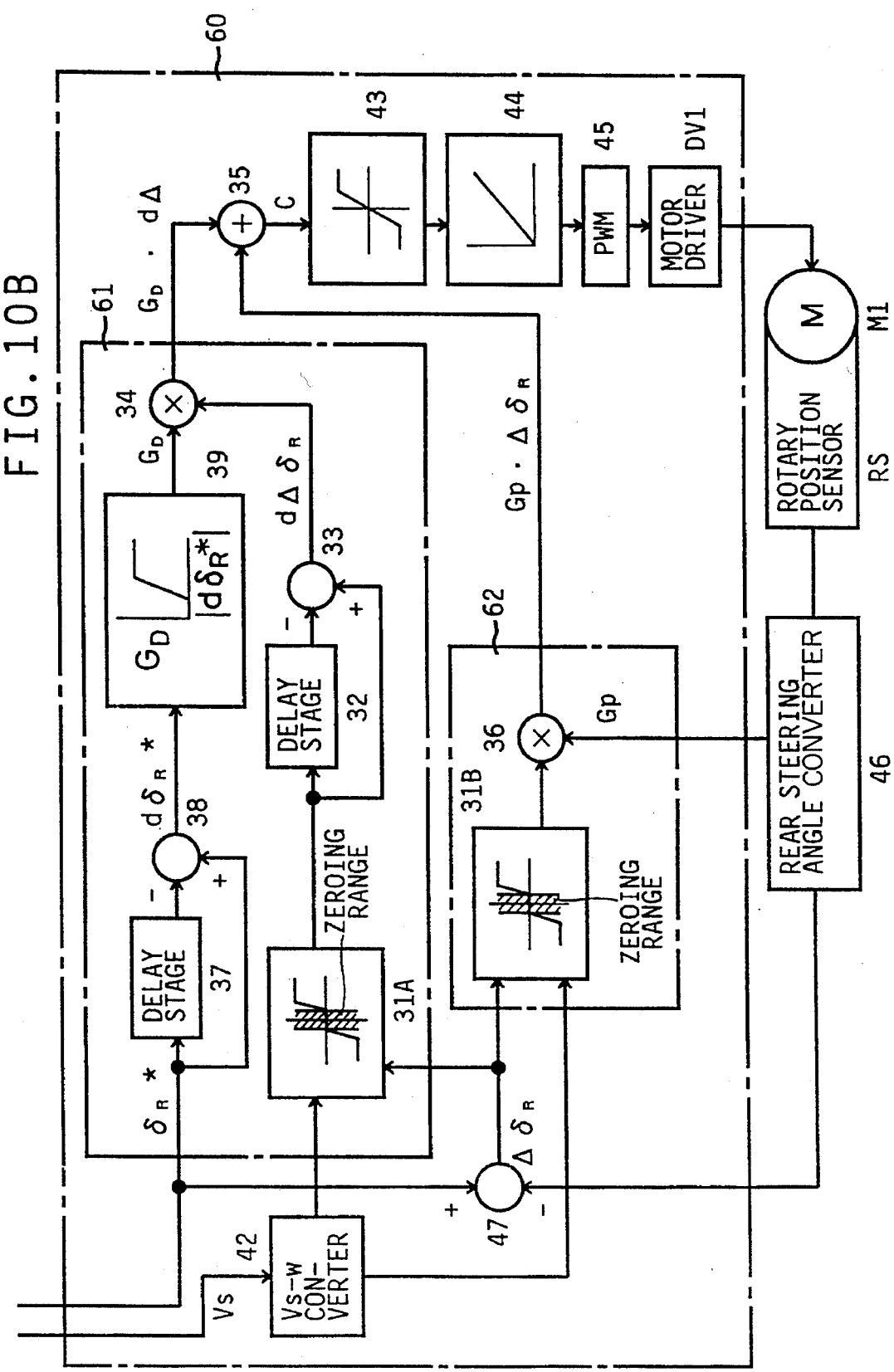

Although the illustrated embodiment uses the microcomputer CPU adapted to perform data processing operations as schematically illustrated in FIGS. 10A and 10B according to the appropriate control programs, the microcomputer CPU may be replaced by ordinary logical operation circuits or analog circuits.

In the illustrated embodiment, the detector 71, 72 is adapted to detect abnormality in the detected value of the yaw rate Ys, and generate a signal upon detection of the abnormality, which causes the limiter 73–80 to latch the target rear steering angle $\delta_R^*$ determined upon detection of the abnormality, and determine a tolerable range of an amount of change in the rear steering angle $\delta_R$, on the basis of the latched target rear steering angle $\delta_R^*$. The tolerable range is defined by an upper and a lower limit which are larger and smaller than the latched target rear steering angle $\delta_R^*$, by a predetermined amount ($\alpha$). The limiter 73–80 limits the final target rear steering angle $\delta_R^*$ to within the determined tolerable range as long as the abnormality of the detected yaw rate Ys remains to be present. This arrangement assures stable steering and running of the vehicle even after the occurrence of the abnormality in the detected yaw rate Ys. Further, the limitation of the final target rear steering angle $\delta_R^*$ to within the tolerable range which is determined on the basis of the target value $\delta_R^*$ upon or immediately after the detection of the abnormality prevents a drastic change in the target rear steering angle $\delta_R^*$, that is, prevents a drastic change in the actual rear steering angle $\delta_R$, even if the target rear steering angle $\delta_R^*$ immediately before the detection of the abnormality is considerably large.

In the illustrated embodiment, the width w of the zeroing ranges used in the converters 21B, 31A and 31B is made larger when the vehicle speed Vs is relatively low. Consequently, when the steering wheel WH is operated while the vehicle speed Vs is relatively low, the rear steering system is not operated when the front steering angle $\delta_F$ is near or almost zero with the steering wheel WH placed near its neutral position, or when the error $\Delta\delta_R$ of the detected rear steering angle $\delta_R$ with respect to the target value $\delta_R^*$ is relatively small. Thus, the frequency of change in the rear steering angle $\delta_R$ by the motor M1 is restricted during running of the vehicle at a relatively low speed Vs.

While the vehicle is running at a relatively high speed Vs in a normal cruising mode, however, the rear steering system is operated even when the front steering angle $\delta_F$ is relatively small or even when the error $\Delta\delta_R$ is relatively small, because the width w of the zeroing ranges of the converters 21B, 31A and 31B is made smaller than that when the vehicle speed Vs is relatively low. It is noted that the amount of change in the front steering angle $\delta_F$ (amount of operation of the steering wheel WH) is comparatively small during running of the vehicle at a high speed Vs, but the present steering control system is arranged so that the rear steering system is highly sensitive to the change in the front steering angle $\delta_F$ during the high-speed running of the vehicle, so that the rear steering wheels TRL, TRR are controlled to control the running direction of the vehicle so as to prevent yawing of the vehicle due to lateral winds, sloping of the road surface and other factors.

The the feedback controller 60 of the illustrated steering control system is adapted to perform a PD control of the rear steering angle $\delta_R$ using the differential control portion 61 and the proportional control portion 62. The differential control portion 61 uses the converter 39 which determines the gain $G_D$ from the absolute value $|d\delta_R^*|$ of the rate of change in the target rear steering angle $\delta_R^*$, such that the gain $G_D$ increases with the absolute value $|d\delta_R^*|$. This arrangement results in a relatively large amount of change in the rear steering angle $\delta_R$ when the rate of change in the target rear steering angle $\delta_R^*$ is relatively high, that is, when the rear steering system is required to exhibit a comparatively high response to changes in the front steering angle $\delta_F$ and yaw rate Ys.

The Gy-Vs converter 52 used to determine the gain Gy to obtain the second product Gy·Ys is adapted such that the gain Gy is comparatively low when the vehicle speed Vs is in a comparatively low range, and comparatively high when the vehicle speed Vs is in a comparatively high range and such that the gain Gy is intermediate when the vehicle speed Vs is in an intermediate range between the comparatively low and high ranges. This arrangement prevents an excessive component Gy·Ys of the target rear steering angle $\delta_R^*$ which depends on the yaw rate Ys, when the vehicle speed Vs is in the high range. Further, the same arrangement assures a sufficient degree of dependence of the target value $\delta_R^*$ upon the yaw rate Ys when the vehicle speed Vs is in the intermediate range. In this respect, it is noted that the vehicle tends to suffer from yawing upon an operation of the steering wheel WH during turning of the vehicle at an intermediate speed Vs. The converter 52 prevents yawing of the vehicle upon returning of the steering wheel WH toward the neutral position at the end of the vehicle turn along a curve. Thus, the present arrangement assures stable high-speed running of the vehicle without an influence by lateral winds, and smooth turning of the vehicle at an intermediate speed Vs, without yawing upon termination of the turning with the front steering angle $\delta_F$ reduced toward zero.

What is claimed is:

1. A steering control system for a vehicle comprising:

a yaw rate sensor for detecting a yaw rate of said vehicle;

means for deriving a component from said detected yaw rate;

an actuator for changing a steering angle of said vehicle; and a controller for electrically controlling said actuator to change said steering angle of said vehicle based on an input which includes at least said component derived from said detected yaw rate, said controller comprising:

a detector for detecting an abnormality of said detected yaw rate; and a limiter for limiting, upon detection of said abnormality, an amount of change made by said actuator to said steering angle of said vehicle to between an upper limit and a lower limit which are different from each other.

2. A steering control system according to claim 1, further comprising:

a steering angle sensor for detecting a steering angle of said vehicle; and a vehicle speed sensor for detecting a running speed of said vehicle, wherein said detector of said controller obtains an estimated yaw rate of said vehicle based on said detected steering angle and said detected running speed, said detector detecting said abnormality when a difference between said estimated yaw rate and said detected yaw rate is greater than a reference value.

3. A steering control system according to claim 1, wherein said controller comprises:

first determining means for determining a provisional target value of said steering angle based on said input;

second determining means for determining a final target value of said steering angle based on said provisional target value if said abnormality is not detected by said detector; and third determining means for determining, if said abnormality is detected by said detector, said upper and lower limits between which said amount of change of said steering angle is limited by said limiter, said upper and lower limits being determined on the basis of said provisional target value determined by said first determining means immediately after said abnormality is detected by said detector, said third determining means determining said final target value based on said provisional target value if said provisional target value currently determined by said first determining means is held between said upper and lower limits, and determining said final target value based on a value selected between said upper and lower limits if said provisional target value currently determined is not between said upper and lower limits.

4. A steering control system according to claim 1, wherein said controller controls said actuator for controlling a steering angle of a steerable rear wheel of said vehicle, and said input to said controller further includes a component derived on the basis of a front steering angle of a steerable front wheel of said vehicle.

5. A steering control system according to claim 4, further comprising:

a front steering angle sensor detecting said front steering angle of said steerable front wheel of said vehicle; and a vehicle speed sensor for detecting a running speed of said vehicle, wherein said detector of said controller obtains an estimated yaw rate of said vehicle on the basis of said detected front steering angle and said detected running speed, said detector detecting said abnormality when a difference between said estimated yaw rate and said detected yaw rate is greater than a reference value.

6. A steering control system according to claim 1, wherein said limiter comprises:

means for determining said upper and lower limits having a first steering angle as said upper limit and a second steering angle as said lower limit; and means for limiting said amount of change of said steering angle to restrict a changed steering angle of said vehicle between said first and second steering angles, said changed steering angle being based on a change in said steering angle undergone after said abnormality is detected.

7. A steering control system according to claim 1, wherein said limiter comprises means for determining said upper and lower limits on the basis of a steering angle of said vehicle when said abnormality is detected.

8. A steering control system according to claim 1, wherein said limiter comprises means for determining, upon detection of said abnormality, said upper and lower limits on the basis of said input including said component derived from said detected yaw rate.

9. A steering control system for controlling a rear steering angle of a steerable rear wheel of a motor vehicle, said steering control system having:

a steering angle sensor for detecting a front steering angle of a steerable front wheel of said vehicle;

a yaw rate sensor for detecting a yaw rate of said vehicle;

a vehicle speed sensor for detecting a running speed of said vehicle;

an actuator for changing said rear steering angle; and a controller for electrically controlling said actuator to change said rear steering angle on the basis of an input which includes a least a component derived from said yaw rate detected by said yaw rate sensor, said controller determining a first gain and a second gain on the basis of said detected running speed of said vehicle, multiplying said detected front steering angle by said first gain to obtain a first product, multiplying said detected yaw rate by said second gain to obtain a second product, adding said first product to said second product to obtain a target value of said rear steering angle, and controlling said actuator so that an actual value of said rear steering angle coincides with said target value, said controller determining a provisional target value of said rear steering angle based on said target value when an abnormality is detected in said detected yaw rate, determining a reference range for said target value on the basis of said provisional target value determined immediately after said abnormality is detected by said detector, determining a final target value based on said provisional target value if said provisional target value currently determined is held within said reference range, and determining said final target value based on a selected value from within said reference range if said provisional target value currently determined is outside said reference range, said controller controlling said actuator according to said final target value to control said rear steering angle.

10. A steering control system for a vehicle, said steering control system comprising:

a yaw rate sensor for detecting a yaw rate of said vehicle;

means for deriving a component from said detected yaw rate;

an actuator for changing a steering angle of said vehicle; and a controller for electrically controlling said actuator to change said steering angle of said vehicle based on an input which includes at least said component derived from said detected yaw rate, said controller comprising:

a detector for detecting an abnormality of said detected yaw rate;

a limiter for limiting, upon detection of said abnormality, an amount of change made by said actuator to said steering angle of said vehicle to between an upper limit and a lower limit which are different from each other;

first determining means for determining a provisional target value of said steering angle based on said input;

second determining means for determining a final target value of said steering angle based on said provisional target value if said abnormality is not detected by said detector; and third determining means for determining, if said abnormality is detected by said detector, said upper and lower limits between which said amount of change of said steering angle is limited by said limiter, said limits being determined on the basis of said provisional target value determined by said first determining means immediately after said abnormality is detected by said detector, said third determining means determining said final target value based on said provisional target value if said provisional target value currently determined by said first determining means is held between said upper and lower limits, and determining said final target value based on a value selected between said upper and lower limits if said provisional target value currently determined is not between said upper and lower limits.

11. A steering control system according to claim 10, further comprising:

a steering angle sensor for detecting a steering angle of said vehicle; and a vehicle speed sensor for detecting a running speed of said vehicle, wherein said detector of said controller obtains an estimated yaw rate of said vehicle based on said detected steering angle and said detected running speed, said detector detecting said abnormality when a difference between said estimated yaw rate and said detected yaw rate is greater than a reference value.

12. A steering control system according to claim 10, wherein said controller controls said actuator for controlling the steering angle of a steerable rear wheel of said vehicle, and said input to said controller further includes a component derived on the basis of a front steering angle of a steerable front wheel of said vehicle.

13. A steering control system according to claim 12, further comprising:

a front steering angle sensor for detecting said front steering angle of said steerable front wheel of said vehicle; and a vehicle speed sensor for detecting a running speed of said vehicle, wherein said detector of said controller obtains an estimated yaw rate of said vehicle on the basis of said detected front steering angle and said detected running speed, said detector detecting said abnormality when a difference between said estimated yaw rate and said detected yaw rate is greater than a reference value.

14. A steering control system according to claim 10, wherein said limiter comprises means for determining said upper and lower limits on the basis of a steering angle of said vehicle when said abnormality is detected.

15. A steering control system according to claim 10, wherein said limiter comprises means for, upon detection of said abnormality, determining said upper and lower limits on the basis of said input including said component derived from said detected yaw rate.

16. A steering control system according to claim 10, wherein said limiter comprises:

means for determining said upper and lower limits having, a first steering angle as said upper limit and second steering angle as said lower limit; and means for limiting said amount of change of said steering angle to restrict a changed steering angle of said vehicle between said first and second steering angles, said changed steering angle being based on a change in said steering angle undergone after said abnormality is detected.

* * * * *